(12) United States Patent
Sugawara et al.

(10) Patent No.: US 11,012,634 B2
(45) Date of Patent: May 18, 2021

(54) IMAGE PICKUP APPARATUS CAPABLE OF PERFORMING IMAGE PICKUP WITH REDUCED FLICKER INFLUENCE, METHOD FOR CONTROLLING THE SAME, AND STORAGE MEDIUM

(71) Applicant: CANON KABUSHIKI KAISHA, Tokyo (JP)

(72) Inventors: Atsushi Sugawara, Yokohama (JP); Yasuhito Takaki, Kawasaki (JP); Takuya Shintani, Kawasaki (JP); Takuro Morita, Tokyo (JP); Yukihiro Matsumoto, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/452,202

(22) Filed: Jun. 25, 2019

(65) Prior Publication Data

US 2020/0007737 A1 Jan. 2, 2020

(30) Foreign Application Priority Data

Jun. 29, 2018 (JP) .............................. JP2018-125529
Jun. 29, 2018 (JP) .............................. JP2018-125530

(Continued)

(51) Int. Cl.
*H04N 5/235* (2006.01)
*G03B 7/093* (2021.01)

(52) U.S. Cl.
CPC ........... *H04N 5/2357* (2013.01); *G03B 7/093* (2013.01); *H04N 5/2351* (2013.01);

(Continued)

(58) Field of Classification Search
CPC ............ H04N 5/23245; H04N 5/2351; H04N 5/2352; H04N 5/2353; H04N 5/2357
See application file for complete search history.

(56) References Cited

U.S. PATENT DOCUMENTS

2008/0049132 A1  2/2008  Suzuki
2009/0295940 A1  12/2009 Shibuno
(Continued)

FOREIGN PATENT DOCUMENTS

CN     1928523 A     3/2007
CN   101394483 A     3/2009
(Continued)

*Primary Examiner* — Daniel M Pasiewicz
(74) *Attorney, Agent, or Firm* — Canon U.S.A., INC. IP Division

(57) ABSTRACT

There is provided with an image pickup apparatus including a detection unit configured to perform a flicker detection operation to detect flicker based on a plurality of images captured by an image sensor, and a control unit configured to control the image sensor based on detected flicker information. The detection unit configured to perform first detection of the flicker detection operation at a time that is different from a time at which an image pickup preparation instruction is received and different from a time at which an image pickup instruction is received whilst live view images are displayed. In the case that a flicker is detected in the first detection, the control unit configured to control exposure of the image sensor in a charge accumulation period to reduce an influence of the flicker for live view display on display means after the first detection.

17 Claims, 25 Drawing Sheets

(30) Foreign Application Priority Data

| Jun. 29, 2018 | (JP) | JP2018-125531 |
| Jun. 29, 2018 | (JP) | JP2018-125532 |
| Jun. 29, 2018 | (JP) | JP2018-125533 |
| May 16, 2019 | (JP) | JP2019-093204 |

(52) U.S. Cl.
CPC ......... *H04N 5/2352* (2013.01); *H04N 5/2353* (2013.01); *H04N 5/2354* (2013.01)

(56) References Cited

U.S. PATENT DOCUMENTS

| 2012/0026358 | A1 | 2/2012 | Hirose | |
| 2012/0057046 | A1 | 3/2012 | Tanaka | |
| 2014/0333799 | A1* | 11/2014 | Nakagawara | H04N 5/2357 |
| | | | | 348/228.1 |
| 2015/0002694 | A1 | 1/2015 | Hasegawa | |
| 2016/0006919 | A1* | 1/2016 | Aoyama | G01J 1/28 |
| | | | | 348/226.1 |
| 2017/0041522 | A1* | 2/2017 | Nakagawara | H04N 5/2357 |
| 2018/0027166 | A1 | 1/2018 | Uchida | |
| 2018/0167545 | A1 | 6/2018 | Kosaka | |
| 2019/0253604 | A1* | 8/2019 | Noda | H04N 5/357 |
| 2019/0289190 | A1* | 9/2019 | Kunishige | H01L 27/1464 |

FOREIGN PATENT DOCUMENTS

| CN | 103546681 A | 1/2014 |
| CN | 106131543 A | 11/2016 |
| CN | 107431764 A | 12/2017 |
| JP | 2009-213076 A | 9/2009 |
| JP | 2013-042298 A | 2/2013 |
| JP | 2014-003548 A | 1/2014 |
| JP | 2014-017713 A | 1/2014 |
| JP | 2015-011073 A | 1/2015 |
| JP | 2016-092787 A | 5/2016 |
| JP | 2018/051615 A1 | 3/2018 |

* cited by examiner

FIG.5A
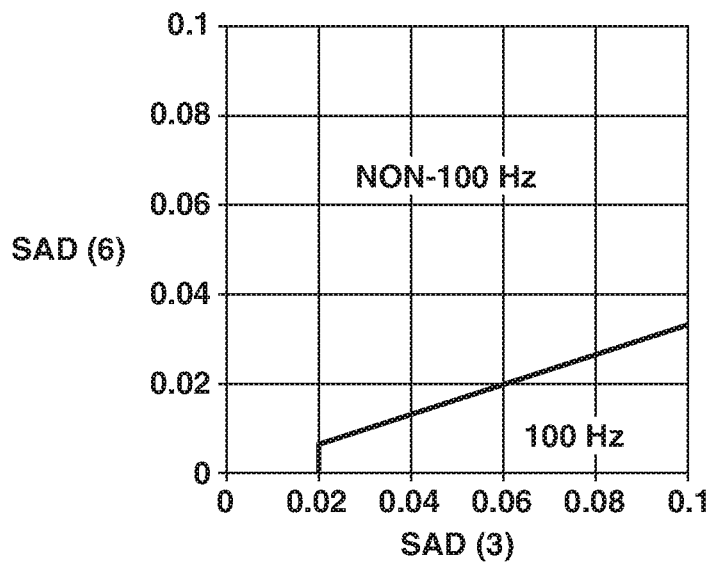
FIG.5B
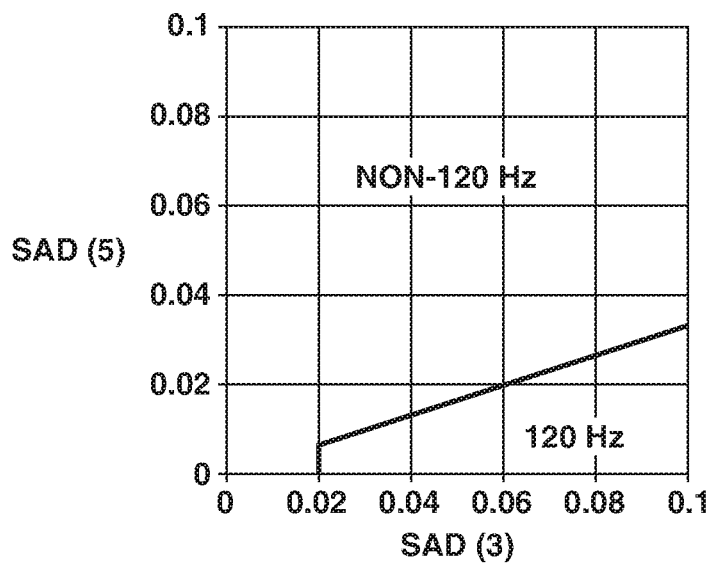
FIG.5C
|  | DETERMINATION RESULT FOR DATA IN FIG. 5A | |
|---|---|---|
|  | 100 Hz | NON-100 Hz |
| DETERMINATION RESULT FOR DATA IN FIG. 5B — 120 Hz | DC | 120 Hz |
| DETERMINATION RESULT FOR DATA IN FIG. 5B — NON-120 Hz | 100 Hz | DC |

FIG.13

| EXPOSURE TIME Tv | EXPOSURE CORRECTION AMOUNT |
|---|---|
| Tv ≤ 1/500 | Comp (0) |
| 1/500 < Tv ≤ 1/250 | Comp (1) |
| 1/250 < Tv ≤ 1/200 | Comp (2) |
| 1/200 < Tv ≤ 1/160 | Comp (3) |
| 1/160 < Tv ≤ 1/125 | Comp (4) |
| 1/125 < Tv | Comp (5) |

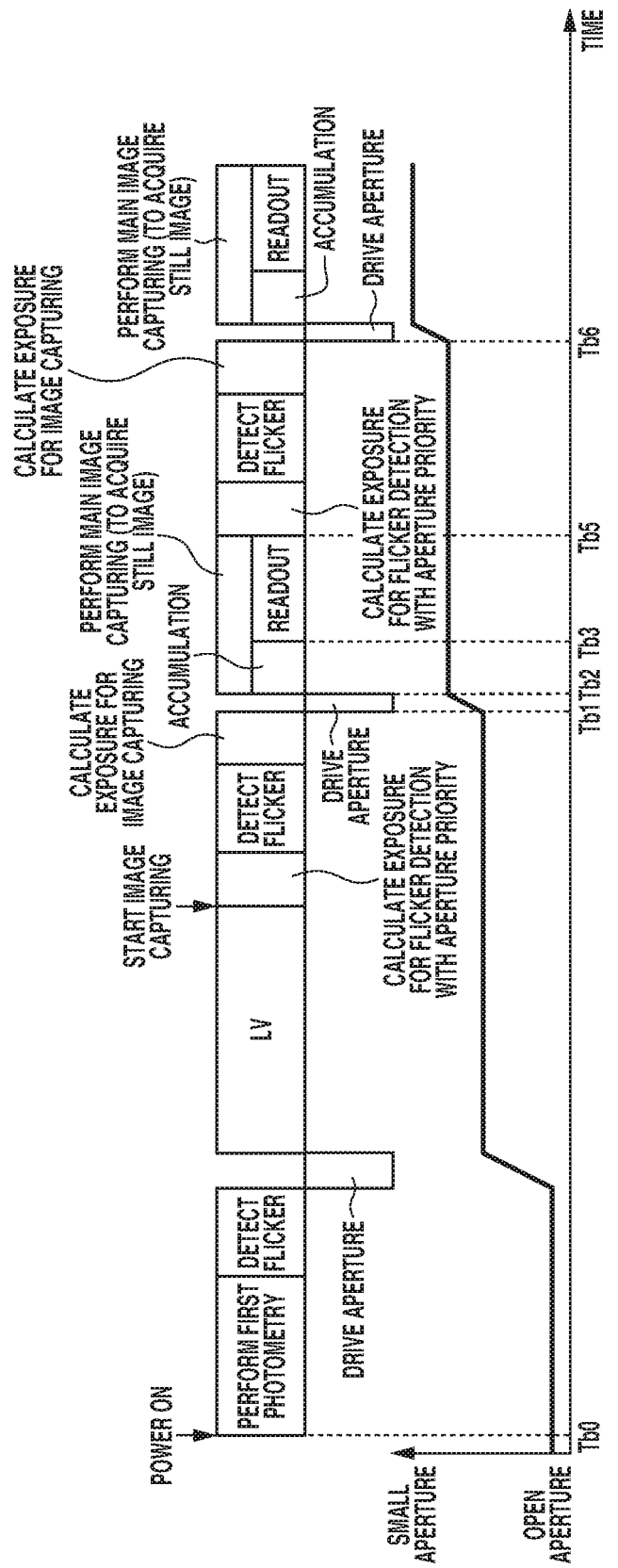

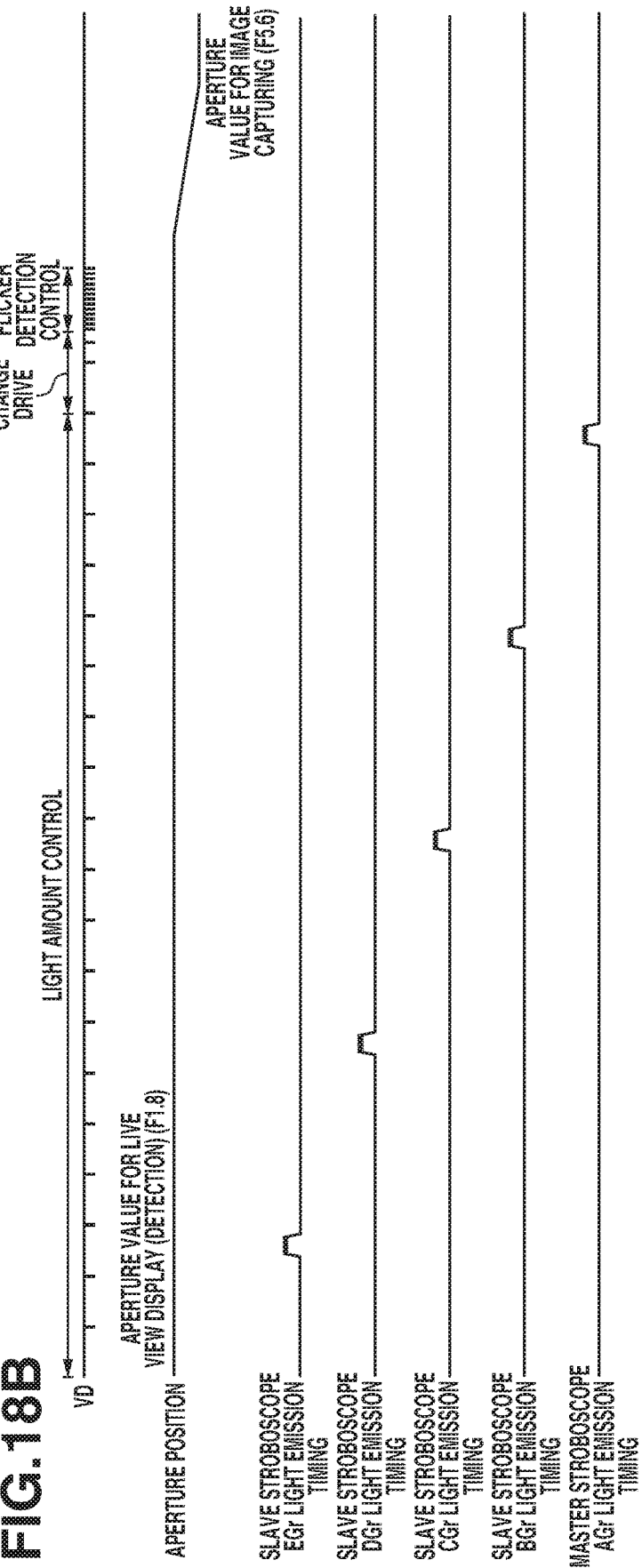
FIG. 18A
FIG. 18B

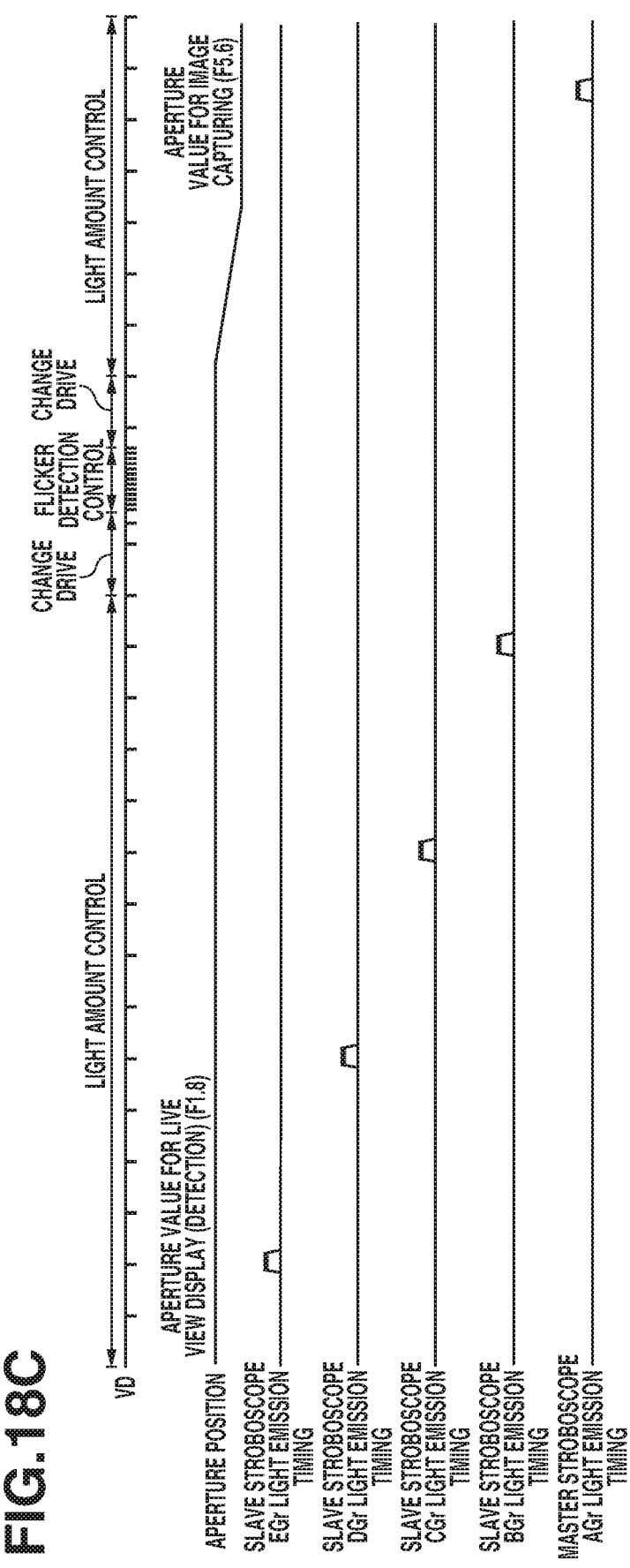

IMAGE PICKUP APPARATUS CAPABLE OF PERFORMING IMAGE PICKUP WITH REDUCED FLICKER INFLUENCE, METHOD FOR CONTROLLING THE SAME, AND STORAGE MEDIUM

BACKGROUND OF THE INVENTION

Field of the Invention

The present invention relates to an image pickup apparatus such as a digital camera, and more particularly to a technique for reducing an influence resulting from a periodical light amount change (generally referred to as a flicker) by an artificial light source when capturing an image of a subject.

Description of the Related Art

It has conventionally been known that, an artificial light source such as a fluorescent light is affected by a commercial power frequency, and the light amount periodically changes to fluctuate illumination light, i.e., a flicker occurs. Under a flicker light source producing such a flicker, if an image of a subject is captured at a shutter speed (or charge accumulation period) shorter than the light amount change period of the flicker, unevenness in brightness and color may occur in one image and among a plurality of images captured in continuous image capturing.

A flicker affects not only a still image but also a moving image. When successively displaying images captured by using an image sensor under a flicker light source on a display unit, what is called displaying a live view, stripes arise in the image or the brightness of the entire image changes because of a flicker according to the charge accumulation period and frame rate of the image sensor.

Japanese Patent Application Laid-Open No. 2009-213076 discusses a technique for detecting a flicker according to changes of a light source, and setting the charge accumulation period of an image sensor as an integral multiple of the light amount change period of the flicker, thus solving the influence of the flicker.

SUMMARY OF THE INVENTION

According to an aspect of the present invention, an image pickup apparatus includes an image sensor, a display unit configured to display a live view for successively displaying images captured by using the image sensor, a detection unit configured to perform a flicker detection operation to detect flicker based on a plurality of images captured by the image sensor at predetermined intervals, a control unit configured to control the image sensor based on flicker information detected by the detection unit, and an operation unit configured to enable a user to perform a manual operation to instruct the detection unit to start the flicker detection operation. The detection unit performs first detection of the flicker detection operation in response to an image pickup instruction by the user. The detection unit performs second detection of the flicker detection operation upon an operation on the operation unit by the user at a time that is different from a time at which the image pickup instruction is received while live view images are displayed on the display unit. When a flicker is detected in the first detection, the control unit controls exposure of the image sensor to perform image pickup in accordance with a predetermined timing of a light amount change in the detected flicker.

Further features of the present invention will become apparent from the following description of embodiments with reference to the attached drawings.

BRIEF DESCRIPTION OF THE DRAWINGS

FIGS. 5A, 5B, and 5C illustrate methods for determining a light amount change period of a flicker according to the first embodiment of the present invention.

FIG. 13 illustrates a method for calculating an exposure correction amount according to the second embodiment of the present invention.

FIGS. 15A and 15B illustrate timing charts and aperture states related to flickerless image capturing processing for each of lenses with different aperture driving methods according to the third embodiment of the present invention.

FIGS. 18A, 18B, and 18C are timing charts illustrating flicker detection processing in light emission image capturing according to the fourth embodiment of the present invention.

DESCRIPTION OF THE EMBODIMENTS embodiments of the present invention will be described below with reference to the accompanying drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

Figure 1:
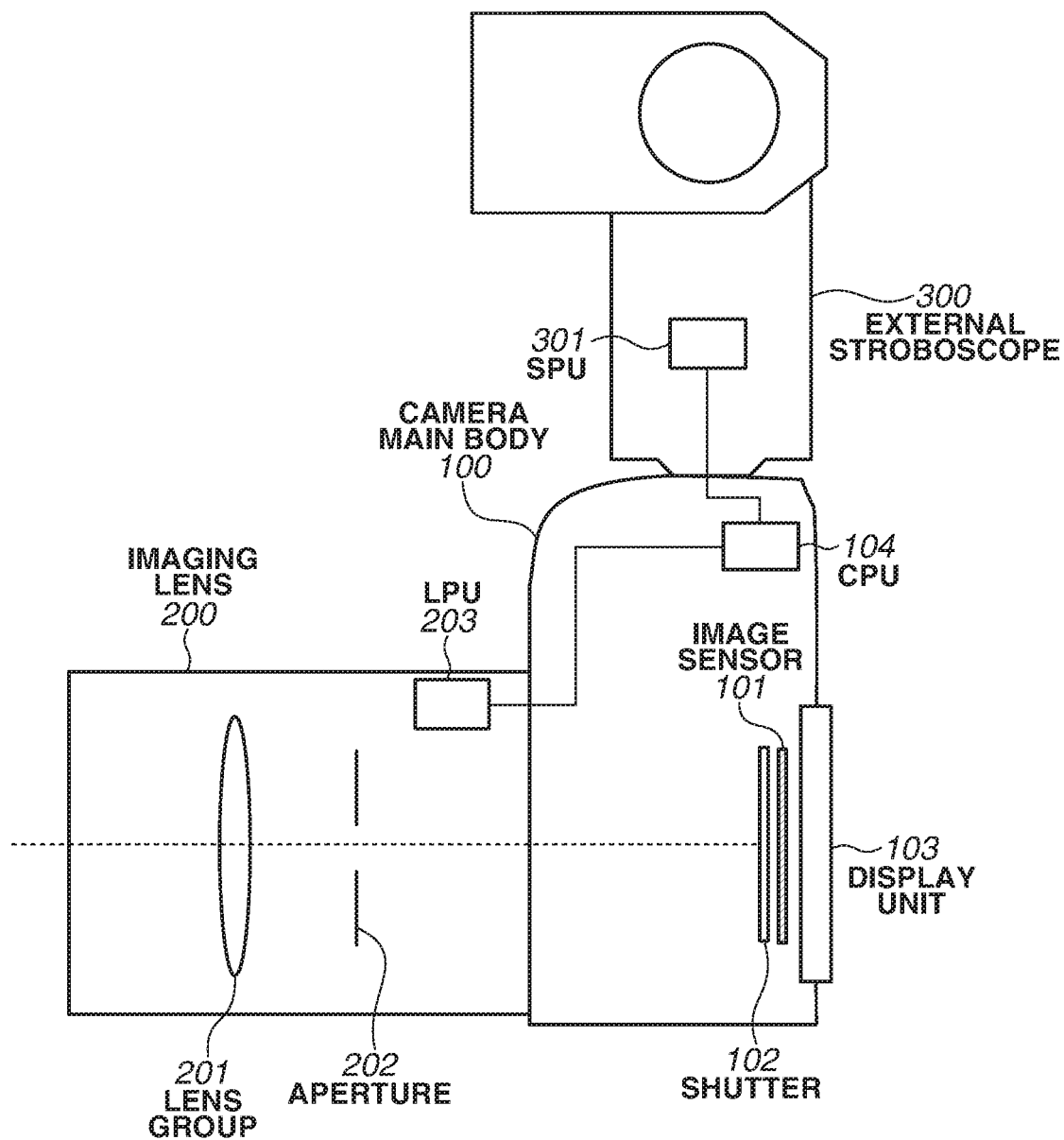
FIG. 1 is a block diagram illustrating an overview of an image pickup system according to a first embodiment of the present invention.
Figure 2:
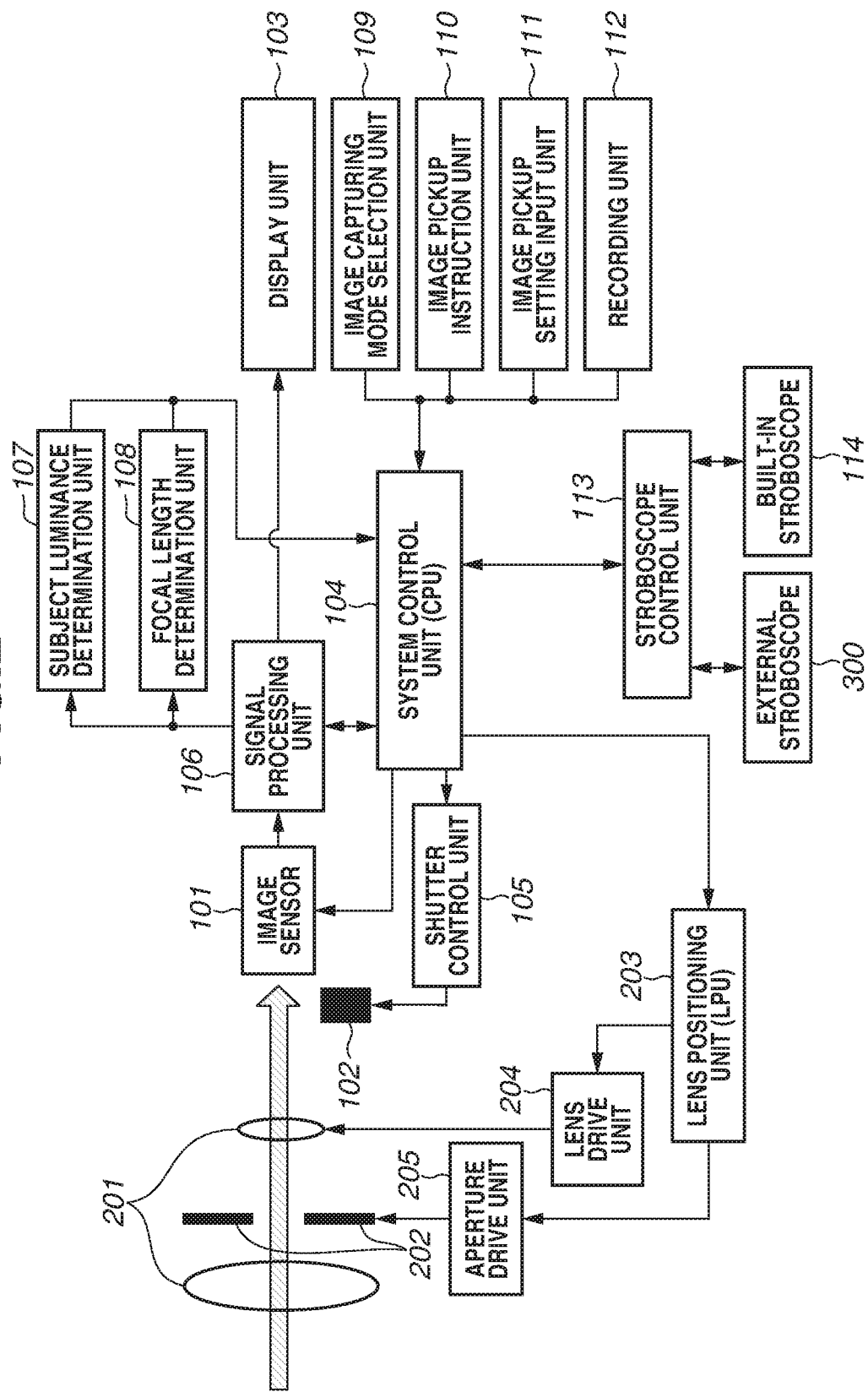
FIG. 2 is a block diagram illustrating details of the image pickup system according to the first embodiment of the present invention.

An image pickup apparatus according to a first embodiment of the present invention will be described below with reference to FIGS. 1 to 6. FIG. 1 is a block diagram illustrating an overview of an image pickup system according to the first embodiment of the present invention. FIG. 2 is a block diagram illustrating details of the image pickup system according to the first embodiment of the present invention. The image pickup system including a camera main body 100, an imaging lens 200, and an external stroboscope 300 as the image pickup apparatus according to the first embodiment of the present invention will be described below with reference to FIGS. 1 and 2.

One or more function blocks illustrated in FIGS. 1 and 2 may be implemented by hardware such as an application specific integrated circuit (ASIC) or a programmable logic array (PLA), or implemented when a programmable processor such as a central processing unit (CPU) or a microprocessing unit (MPU) executes software. In addition, the function blocks may be implemented by a combination of software and hardware. Therefore, in the following descriptions, even if different function blocks are described as operating entities, these function blocks are implementable by the same hardware entity.

The camera main body 100 of a digital camera is an image pickup apparatus according to the present embodiment. An image sensor 101 is a charge accumulation type solid-state image sensor, such as a charge coupled device (CCD) sensor or a complementary metal oxide semiconductor (CMOS) sensor including an infrared cut filter and a low-pass filter. The image sensor 101 forms an optical image corresponding to the light flux of a subject guided by the imaging lens 200. Images picked up by using the image sensor 101 are successively displayed at a display unit 103 (described below) to achieve what is called a live view function. Images picked up by the image sensor 101 are also used as captured images for flicker detection and recording (described below).

A shutter 102 is a light shielding member disposed on the anterior side of the image sensor 101 on the optical path of the light flux guided by a lens group 201. The shutter 102 includes a blade member. In a state where the blade member is opened, the light flux from the subject can be intercepted. In a state where the blade member is folded, an optical image corresponding to the light flux from the subject focused on the image sensor 101 can be formed on the image sensor 101. The camera main body 100 is capable of adjusting the amount of light incident to the image sensor 101 according to the running speed of the shutter 102. The brightness of the image signal can be adjusted by changing the shutter speed as an exposure condition based on the running speed of the shutter 102 and the exposure time of the image sensor 101. As a configuration for performing a similar operation to the shutter 102, an electronic shutter operating through accumulation control in the image sensor 101 may be adopted.

A display unit (hereinafter simply referred to as a display) 103 is a thin-film transistor drive type liquid crystal display unit (TFT type LCD). The display 103 can display an image for display based on information about image capturing parameters, such as the exposure for subject image capturing and an image captured by using the image sensor 101, enabling a live view (display) for successively displaying the image for display. The display 103 is what is called a touch panel which also serves as an operation unit enabling the user to perform touch operations. According to the present embodiment, the display 103 functions as a capacitance touch panel. The configuration of the display unit 103 enabling touch operations is not limited to capacitance detection. Any known methods are applicable to the display unit 103.

The system control unit (CPU) 104 totally controls the camera main body 100 and each unit of a camera accessory attached to the camera main body 100. The contents of control performed by the CPU 104 will be described in detail below in the descriptions of various operations.

The imaging lens 200 is an optical apparatus for guiding the light flux corresponding to the optical image of the subject to the inside of the camera main body 100. The lens group 201 of the imaging lens 200 is an optical system including a focus lens, a zoom lens, and a shift lens. An aperture 202 is a light amount adjustment member for adjusting the amount of light incident to the inside of the camera main body 100 by adjusting the diameter of the aperture opening.

The imaging lens 200 includes a lens positioning unit (LPU) 203 as a control unit for the imaging lens. The LPU 203 controls the lens position of the lens group 201 and the aperture diameter of the aperture 202 and also serves as a communication control unit for controlling communication with the CPU 104 of the camera main body 100.

An aperture drive unit 205 is a component for driving the aperture 202 of the imaging lens 200. More specifically, the aperture drive unit 205 drives the aperture 202 to the aperture position specified by the LPU 203 to adjust the opening of the aperture 202 to the open area amount corresponding to the aperture value. A lens drive unit 204 is a component for driving the lens group 201 of the imaging lens 200 to a predetermined position, i.e., the position specified by the LPU 203.

The shutter control unit 105 is a component for controlling the opening/closing state of the shutter 102. Controlling the running state of the shutter 102 in the time period specified by CPU 104 enables controlling the shutter speed for subject image capturing. A signal processing unit 106 is a component for performing various types of processing on the image signal output from the image sensor 101. More specifically, the signal processing unit 106 performs predetermined image interpolation, resizing processing such as reduction, color conversion processing, and processing for calculating the amount of pixel data including saturated pixels and underexposure pixels, on digital image data. The signal processing unit 106 is a white balance (WB) processing unit for performing white balance (hereinafter simply referred to as WB) calculation processing on digital image data.

A recording unit 112 is a recording medium for recording the image signal acquired in image pickup. The recording unit 112 is capable of recording the image signal acquired by using the image sensor 101 as still image data or video data. The recording unit 112 is used also as a memory for recording data related to operations of the image pickup system centering on the camera main body 100 and various data acquired by using the camera main body 100. The recording unit 112 according to the present embodiment includes a read only memory (ROM) area usable as a nonvolatile memory and a random access memory (RAM) area usable as a volatile memory.

An image capturing mode selection unit 109 selects one of image capturing modes settable on the camera main body 100. The image capturing modes according to the present embodiment are modes providing different methods for setting exposure-related elements (exposure control values). Examples of settable image capturing modes include an aperture-value (Av) priority mode for preferentially setting the aperture value, and a shutter-speed (Tv) priority mode for preferentially setting the shutter speed. The image capturing mode selection unit 109 is electrically connected with the CPU 104 which controls the camera main body 100 according to the image capturing mode selected via the image capturing mode selection unit 109.

An image pickup instruction unit 110 is electrically connected with the CPU 104. When the user manually presses the image pickup instruction unit 110, a signal is enabled to issue an image-pickup preparation instruction and an image pickup instruction. In other states, the signal is disabled. The image pickup instruction unit 110 changes in two steps of the depression state. The CPU 104 recognizes the half-press state of the image pickup instruction unit 110 as an image pickup standby state, and instructs each unit of the image pickup apparatus 100 to perform an image-pickup preparation operation. The CPU 104 recognizes the full-press state of the image pickup instruction unit 110 as an image pickup state, and instructs each unit of the image pickup system to perform an image pickup operation.

An image pickup setting input unit 111 is an information input unit used to set various modes and functions in the camera main body 100. Although, in the present embodiment, the image pickup setting input unit 111 includes a rotating dial, a four-way operation key, an apply button, and a reset button, a mechanism used for information input is not limited thereto. Typical modes and functions settable by using the image pickup setting input unit 111 include various settings related to the photometry mode, image capturing mode, continuous image capturing function, flickerless image capturing function (described below), live view, and light emission image capturing function. When the image pickup setting input unit 111 is operated, graphical user interfaces (GUIs) and function icons related to these functions are displayed on the display 103.

Photometry modes, as modes for evaluating the entire screen corresponding to the field angle of the image sensor 101, include evaluation photometry for performing correction according to the focusing point and luminance value, and center-weighted photometry for performing photometry with the center portion of the screen more largely weighted than other regions. Other photometry modes include spot photometry for performing photometry based only on a part of the screen, and partial photometry for performing photometry based only on a predetermined region on the screen which is larger than a spot.

Live view display methods (modes) include a normal mode in which a composition check is possible, in consideration of the appearance of the live view, and a simulation mode in which the exposure when performing main subject image capturing and capturing a still image for recording (recording image) is simulated in the live view. One of differences between the normal and the simulation modes is whether the exposure correction amount manually input by the user is reflected to the live view. In the normal mode, the exposure correction amount is not reflected to the live view. In the simulation mode, the exposure correction amount is reflected to the live view with the user's intention given priority.

A subject luminance determination unit 107 is a luminance detection unit for determining (detecting) the brightness (luminance value) of the subject based on the image signal output from the signal processing unit 106. More specifically, the subject luminance determination unit 107 divides one screen corresponding to the acquired image signal into a plurality of blocks and calculates the average luminance value for each block. Then, the subject luminance determination unit 107 integrates the average luminance value of each block to acquire the representative luminance value. In the subsequent descriptions, the representative luminance value is regarded as the luminance value (photometry value) of the subject, and the luminance value is used for various types of processing and control such as the exposure control. The method for detecting the luminance value is not limited thereto, and various types of methods for the luminance value calculation are applicable. The CPU 104 calculates the exposure control amounts of various exposure control values (shutter speed, aperture value, ISO sensitivity, etc.) based on the luminance value detected by the subject luminance determination unit 107 and the image capturing mode selected by the image capturing mode selection unit 109.

A focal length determination unit 108 calculates information for determining whether the lens position of the focus lens included in the imaging lens 200 is in the in-focus state, based on the image signal output from the signal processing unit 106. If the current lens position is determined to be in the out-of-focus state based on the calculated information, the CPU 104 controls the imaging lens 200 via the LPU 203. Regardless of the in-focus state, the position of the focus lens can be adjusted under the control of the CPU 104 in response to an input of a user operation.

When the CPU 104 determines that the illumination on the subject is required through light emission determination based on the luminance value, a stroboscope control unit 113 performs light emission control on a light emission unit in response to a user manual operation. The light emission unit according to the present embodiment is a built-in stroboscope 114 built in the camera main body 100 or the external stroboscope 300 detachably attached to the camera main body 100 via a connection unit (not illustrated).

The external stroboscope 300, an external light emitting device detachably attached to the camera main body 100, includes an external stroboscope control unit (SPU) 301 for controlling the operation of the external stroboscope 300. The SPU 301 is a control unit for controlling light emitting of the external stroboscope 300 and communication with the camera main body 100.

(Flicker Detection and Flickerless Image Capturing Functions)

Figure 3:
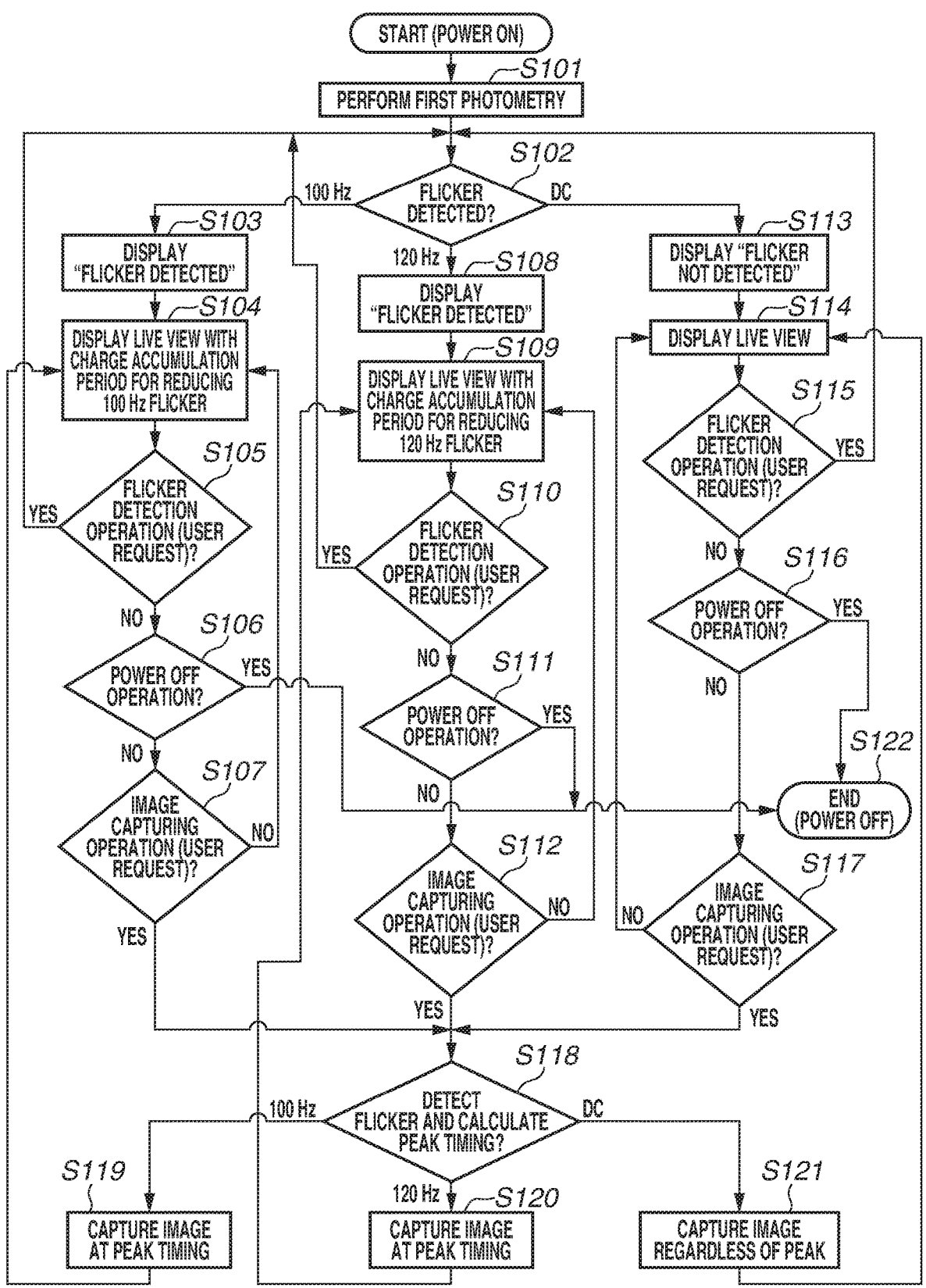
FIG. 3 is a flowchart illustrating image capturing processing for performing flicker detection during live view display according to the first embodiment of the present invention.

The flicker detection operation during live view display on the camera main body 100 will be described below with reference to FIG. 3. FIG. 3 is a flowchart illustrating image capturing processing for performing the flicker detection during live view display according to the first embodiment of the present invention. The following descriptions will be made centering on a case where live view display is started when the power switch (not illustrated) of the camera main body 100 is turned on with the flickerless image capturing function turned on in advance.

When the power switch of the camera main body 100 is turned on, then in step S101, the CPU 104 captures an image by using the image sensor 101 and performs a photometry operation based on the image. The photometry operation (first photometry) is performed to achieve suitable exposure conditions when performing subject image pickup (exposure time, aperture value, and ISO sensitivity) before starting an operation for the live view or flicker detection.

Figure 4A:
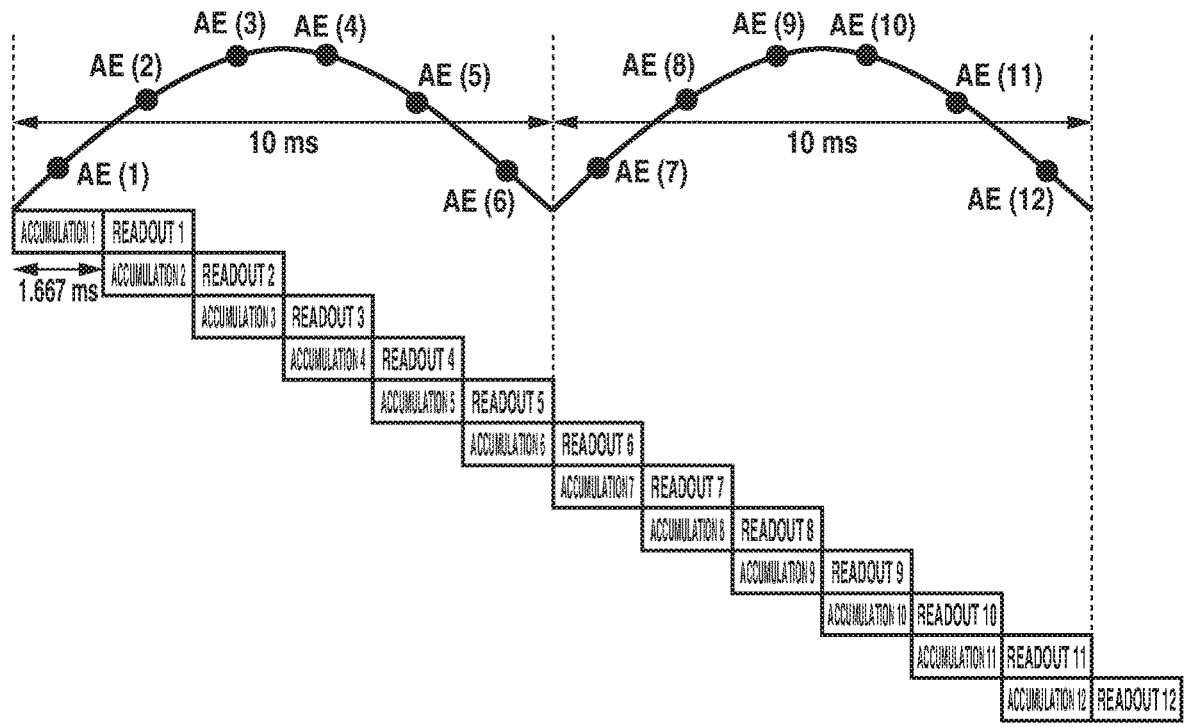
FIGS. 4A and 4B illustrate a charge accumulation timing and a charge readout timing related to an image signal for flicker detection according to the first embodiment of the present invention.
Figure 4B:
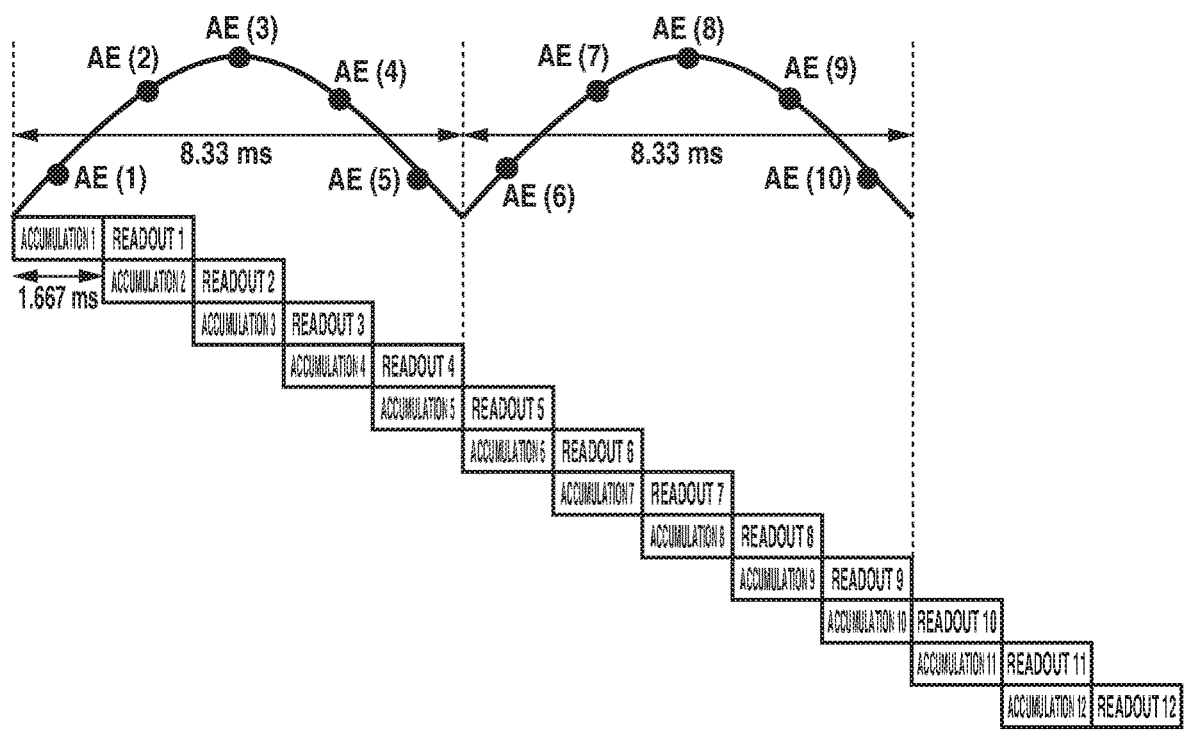

In step S102, the CPU 104 performs the flicker detection operation. The flicker detection operation according to the present embodiment will be described below with reference to FIGS. 4A and 4B. FIGS. 4A and 4B illustrate a charge accumulation timing and a charge readout timing related to the image signal for flicker detection according to the first embodiment of the present invention. The CPU 104 continuously performs the accumulation and readout operations 12 times at a frame rate of 600 frames per second (fps) and at intervals of about 1,667 milliseconds.

The value 600 fps equals the least common multiple of the light amount change intervals (100 Hz and 120 Hz) of a flicker to be estimated in advance. Performing the accumulation operation 12 times at 600 fps means performing the accumulation operations during a time period of 20 milliseconds on an overall operation basis. Whichever commercial power frequency, 50 or 60 Hz, is used, two light amount change periods of a flicker light source will be included. All of the 12 accumulation operations are performed under the same exposure conditions which are determined based on the result of the photometry operation in step S101. Not all the pixels of the image sensor 101 may be used for the accumulation and readout operations at 600 fps. The frame rate may be adjusted to 600 fps (1,667-ms intervals) by performing what is called pixel addition readout and thinning readout. As the luminance value to be used as a reference when determining the exposure at the time of 600-fps drive, values output from regions of the image sensor 101 used for the flicker detection operation are desirably used.

FIG. 4A illustrates accumulation control and an image signal output transition when a flicker occurs by the 50-Hz commercial power (at flicker turn-on intervals of 100 Hz). As illustrated in FIG. 4A, the n-th accumulation is referred to as "ACCUMULATION n", the n-th readout is referred to as "READOUT n", and the output of the image signal (photometry value) which can be acquired based on the result of READOUT n is referred to as "AE(n)". According to the present embodiment, the CPU 104 performs the accumulation operation 12 times in a series of flicker detection operations to acquire outputs AE(1) to AE(12). The acquisition time of each output is represented by the median in the charge accumulation period since the CPU 104 performs the accumulation operation in a limited time period.

The evaluation value to be used for the determination of the light amount change period (frequency) of a flicker is calculated based on these outputs AE(1) to AE(12). According to the present embodiment, the evaluation value to be used to determine the light amount change period of the flicker will be defined by the following Formula (1).

$$SAD\ (m) = \sum_{i=1}^{6} |AE(n) - AE(n+m)| \quad (1)$$

Sum of Absolute Difference (SAD) is used as an index representing the similarity in the field of pattern matching. A numerical value m means the calculation of the similarity between the output of the n-th output AE(n) and the output of the (n+m)-th output AE(n+m) out of 12 accumulation operations. SAD(m) calculates the similarity between the output of the n-th output AE(n) and the output after a time lapse of (1.667×m) milliseconds. As represented by the Formula (1), the value of SAD(m) decreases with increasing similarity.

For example, under a 100-Hz flicker light source, the light amount change period of the flicker is about 10 milliseconds, and the relation with a flicker detection interval of 1.667 milliseconds is 10/1.667≈6. Therefore, as illustrated in FIG. 4A, the same output is acquired at intervals of six operations regardless of charge accumulation timing, resulting in a relation AE(n)≈AE(n+6). Based on this characteristics, SAD (6) is calculated to SAD(6)≈0 under a 100-Hz flicker light source. SAD(3) is additionally calculated to detect the presence of a 100-Hz flicker. SAD(3) is the calculated value of the similarity with the output after a time lapse of 1.667×3=5 milliseconds. Under a 100-Hz flicker light source, since the photometry values at 5-ms different timing are in a reversed phase relation, SAD(3) has a very large value compared to SAD(6). More specifically, in a case of large SAD(3) and small SAD(6), it is thought that a flicker corresponding to the 100-Hz light amount change period may occur (exist).

FIG. 4B illustrates accumulation control and an image signal output transition when a flicker occurs by the 60-Hz commercial power (at flicker turn-on intervals of 120 Hz). Like the case where the light amount change period of the flicker is 100 Hz, SAD(5) and SAD(3) are calculated when a flicker occurs by the 60-Hz commercial power (at flicker turn-on intervals of 120 Hz). Under a 120-Hz flicker light source, since the light amount change period of the flicker is about 8.333 milliseconds, AE(n)≈AE(n+5) and therefore SAD(5)≈0. Under a 120-Hz flicker, photometry values are in a reversed phase relation after a time lapse of 4.16 milliseconds. In this case, it is ideal to determine the similarity with the waveform after a time lapse of 4.16 milliseconds. However, since 4.16 milliseconds is not an integral multiple of a frame period of 1.667 milliseconds, the value of SAD(3) indicating the similarity with the waveform after a time lapse of 5 milliseconds as a comparatively close value is alternatively used. More specifically, also under a 120-Hz flicker light source, since SAD(3) indicates the similarity of photometry value change at an interval close to the reversed phase, SAD(3) has a very large value compared to SAD(5).

As described above, the CPU 104 calculates SAD(6), SAD(5), and SAD(3) to finally determine the light amount change period of the flicker by using these evaluation values. FIGS. 5A, 5B, and 5C illustrate methods for determining the light amount change period of the flicker according to the first embodiment of the present invention. FIG. 5A illustrates data used to determine a flicker having a light amount change period of 100 Hz. FIG. 5B illustrates data used to determine a flicker with a light amount change period of 120 Hz. FIG. 5C illustrates data used to detect the presence or absence of a flicker and the light amount change period.

As described above, under a 100-Hz flicker light source, SAD(3) has a very large value compared to SAD(6). Therefore, considering a plane with the horizontal axis assigned SAD(3) and the vertical axis assigned SAD(6), as illustrated in FIG. 5A, plots are acquired in the relatively lower right region on this plane under a 100-Hz flicker light source. More specifically, in the region segmentation illustrated in FIG. 5A, a region determined to be a 100-Hz flicker and a region determined to be non-100-Hz flicker are set. A 100-Hz flicker can be accurately determined based on the plot position in these regions.

Likewise, in the region segmentation for a plane with the horizontal axis assigned SAD(3) and the vertical axis assigned SAD(5), as illustrated in FIG. 5B, a 120-Hz flicker can also be determined. The region segmentation lines illustrated in FIGS. 5A and 5B are to be considered as examples. The inclination and inflection points of each division line are not limited thereto.

The CPU 104 performs the final flicker detection by integrating the results of determinations on the presence or absence of a flicker related to the above-described light amount change periods. According to the present embodiment, the CPU 104 performs the final flicker detection related to the detection of the presence or absence of a flicker and the light amount change period by using the correspondence table illustrated in FIG. 5C. When no flicker exists ("DC" in FIG. 5C), the outputs through the 12 accumulation operations do not largely change in time. Therefore, a comparison of the outputs gives AE(1)≈AE(2)≈AE(3)≈ . . . ≈AE(12), resulting in the evaluation values SAD(6)≈SAD(5)≈SAD(3)≈0. In this case, since plots are acquired near the origin on the planes illustrated in FIGS. 5A and 5B, the CPU 104 determines that neither a 100-Hz flicker nor a 120-Hz flicker exists (occurs). Therefore, "DC" in the lower right box in the table illustrated in FIG. 5C is applied.

The box at the upper left of the table illustrated in FIG. 5C indicates the occurrence of a 100-Hz flicker and a 120-Hz flicker. Such a determination result is not normally acquired. However, for example, if the subject changes during 12 accumulation operations because of the movement of the subject or a panning operation, the result is not limited thereto. In this case, since the result of the flicker detection is an error, the CPU 104 determines that no flicker exists (detected). This completes the description of the flicker detection operation in step S102.

Returning to FIG. 3, when the CPU 104 detects a 100-Hz flicker (100 Hz in step S102), the processing proceeds to step S103. In step S103, the CPU 104 displays a message "FLICKER DETECTED" on the display 103 to notify the user that a flicker has been detected. This display for notifying the user that a flicker has been detected may be superimposed on the live view image, or displayed with the live view temporarily stopped.

The method for notifying the user of the flicker detection is not limited thereto. A notification in any form and any format is applicable as long as the flicker detection can be notified to the user. For example, a function icon indicating the flicker detection may be displayed on a GUI on the display 103, or the flicker detection may be notified with sound by using a speaker (not illustrated) in addition to the display on the display 103. Not only the flicker detection but also the light amount change period of the detected flicker may be notified at the same time.

In step S104, the CPU 104 sets the charge accumulation period of the image sensor 101 as an integer multiple of the 100-Hz light amount change period (10 milliseconds) of the flicker and performs a live view. The CPU 104 periodically performs the photometry operation on the subject based on the image for live view even during live view display and performs the exposure control based on the photometry result.

Factors which interrupt the live view include a flicker detection operation requested by the user, a power-off operation, and an operation for subject image capturing. These elements will be described below in this order.

In step S105, the CPU 104 determines whether the flicker detection operation has been performed by the user request. The CPU 104 performs the flicker detection operation when the user touches the icon for flicker detection displayed on the display 103. When the CPU 104 determines that the flicker detection operation has been performed by the user request (YES in step S105), the processing returns to step S102. Then, the CPU 104 repeats the flicker detection operation. In this case, the drive of the image sensor 101 is changed from the drive for live view to the drive for flicker detection (600-fps drive). The exposure conditions for the 600-fps drive are set from the photometry result based on the last live view image.

As described above, an image to be used for the flicker detection is subjected to pixel addition or thinning readout. Therefore, when the drive of the image sensor 101 is changed from the drive for live view to the drive for flicker detection, an image with a low resolution may be temporarily displayed. Then, the CPU 104 does not display the image captured with the 600-fps drive for flicker detection on the display 103 (not used for the live view). Meanwhile, the CPU 104 continuously displays the image for live view captured last on the display 103 (this state is referred to as a frame stop).

The CPU 104 needs to perform the 600-fps drive for flicker detection only in the 12 charge accumulation periods. If the time until the completion of the flicker detection operation is included, the drive completes in a short period for about 30 milliseconds. Therefore, even if the CPU 104 performs the flicker detection operation by the user's intention, the CPU 104 only needs to perform a frame stop for about 30 milliseconds after the flicker detection operation. This enables the user to easily know the result of the flicker detection operation while preventing the user from feeling strangeness as much as possible.

On the other hand, when the CPU 104 determines that the flicker detection operation has been performed by the user request (NO in step S105), the processing proceeds to step S106. In step S106, the CPU 104 determines whether a power-off operation has been performed by the user. When the CPU 104 determines that the power-off operation has been performed by the user (YES in step S106), the processing proceeds to step S122. In step S122, the CPU 104 cancels the live view and turns off power of the camera main body 100.

On the other hand, when the CPU 104 determines that the power-off operation has been not performed by the user (NO in step S106), the processing proceeds to step S107. In step S107, the CPU 104 determines whether the image capturing operation has been performed by the user. When the CPU 104 determines that the image capturing operation has been performed by the user (YES in step S107), the CPU 104 cancels the live view and the processing proceeds to step S118 and the subsequent steps. In step S118 and the subsequent steps, the CPU 104 performs the flicker detection and flickerless image capturing. The flicker detection and flickerless image capturing based on the image capturing operation will be described in detail below.

When the CPU 104 detects a 120-Hz flicker (120 Hz in step S102), the processing proceeds to step S108. Processing in steps S108 to S112 will be described below. Processing when a 120-Hz flicker is detected is basically identical to the processing when a 100-Hz flicker is detected. More specifically, the processing in steps S108 to S112 is almost identical to the processing in steps S103 to S107. However, the charge accumulation period of the image sensor 101 when capturing an image for live view in step S109 is set to an integer multiple of the 120-Hz light amount change period (about 8.33 milliseconds) of the flicker to reduce the influence of the 120-Hz flicker.

When the CPU 104 detects no flicker (DC in step S102), the processing proceeds to step S113. Processing in steps S113 to S117 will be described below. Processing when no flicker is detected is basically the same as the processing when a 100 Hz or 120-Hz flicker is detected. However, since no flicker is detected in this case, then in step S113, the CPU 104 displays a message "FLICKER IS NOT DETECTED" on the display 103. In step S114, the CPU 104 does not need to control the charge accumulation period of the image sensor 101 in accordance with the light amount change period of the flicker, the CPU 104 performs the exposure control to achieve the optimum charge accumulation period based on the photometry result.

In the processing in steps S103 to S117, as described above, when the user performs the flicker detection operation during live view display, the CPU 104 performs the flicker detection operation and informs the user of the detection result. As the exposure control for capturing an image for live view, the CPU 104 controls the charge accumulation period during live view display according to the result of the flicker detection, making it possible to effectively reduce the influence of the flicker in the live view.

In step S118, immediately before the main subject image capturing, the CPU 104 performs processing for performing the flicker detection operation and calculating the peak timing of the light amount change of the flicker. The following describes the reason why the CPU 104 performs the flicker detection operation upon execution of the image capturing operation by the user (upon issuance of the image pickup instruction). As described above, according to the present embodiment, the CPU 104 performs the flicker detection operation immediately after power of the camera main body 100 is turned on (i.e., immediately before live view display is started) when the user performs a flicker detection operation (issues a flicker detection instruction). However, in a configuration where the flicker detection operation is performed only at these timings, the CPU 104 may execute the flickerless image capturing function since the flicker detection cannot be suitably performed.

For example, if a lens cap is attached to the imaging lens 200 when power of the camera main body 100 is turned on, the CPU 104 cannot exactly perform the flicker detection before starting live view display. In this state, if an instruction for main subject image capturing (recording image acquisition operation) is issued without the flicker detection operation by the user, the CPU 104 will perform image capturing under conditions similar to those in a case where no flicker occurs, even under a flicker light source. Furthermore, for example, even if the user performs the flicker detection operation, when the image capturing environment changes before and after the flicker detection operation (for example, when the user moves between indoor and outdoor environments), a difference may possibly occur between the flicker detection result and the actual image capturing environment. In any one of the above-described cases, it is likely that the image captured in main image capturing is affected by the flicker or that a release time lag increases even not under a flicker light source.

According to the present embodiment, therefore, the CPU 104 performs the flicker detection operation immediately before main image capturing. The flicker detection operation in step S118 is identical to that in step S102 described above, and redundant descriptions thereof will be omitted. In step S118, the CPU 104 calculates a flicker peak timing in accordance with the flicker detection operation. The calculation will be described in detail below.

Figure 6:
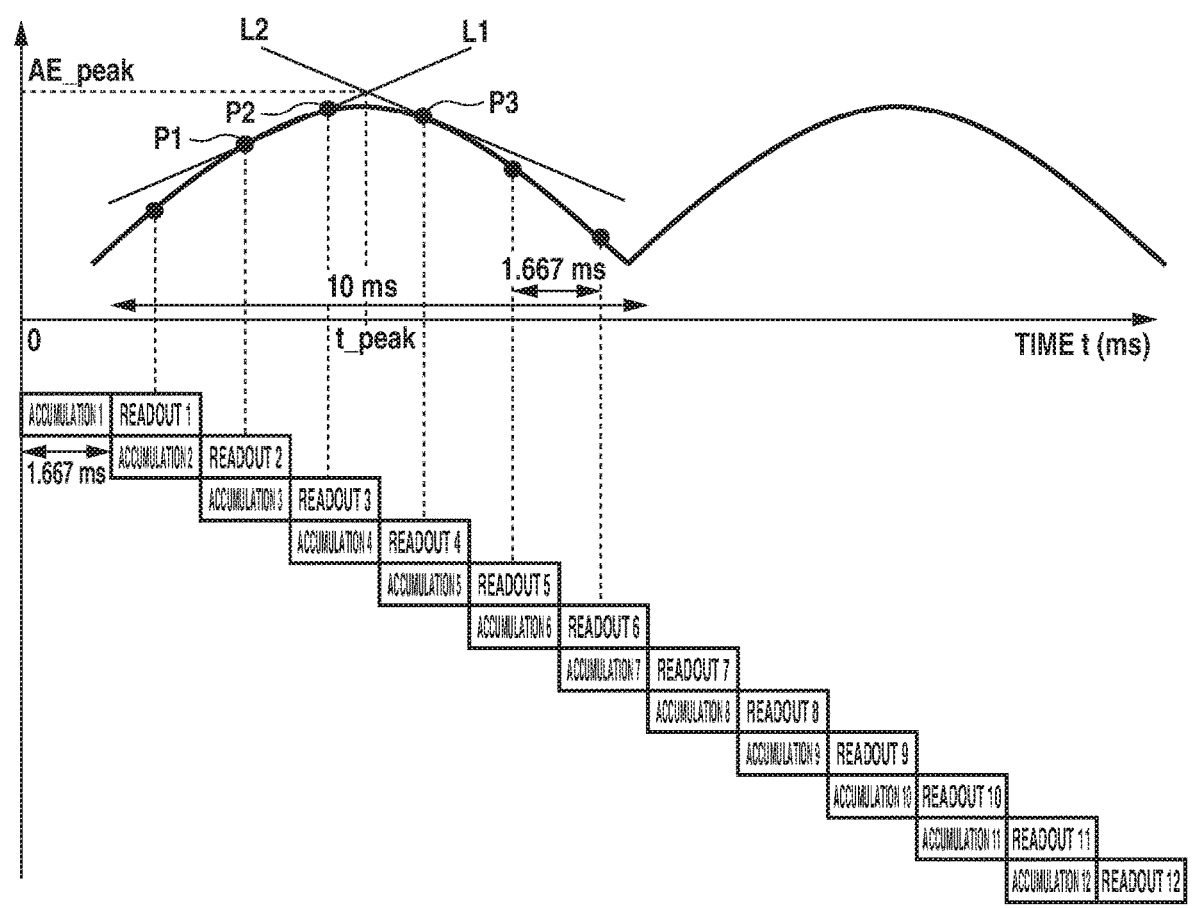
FIG. 6 illustrates a method for calculating a flicker peak timing according to an embodiment of the present invention.

FIG. 6 illustrates a method for calculating a flicker peak timing according to an embodiment of the present invention. Among outputs for flicker detection AE(1) to AE(12), the point where the maximum output is acquired is represented by P2(t(m), AE(m)), the point of the preceding photometry result is represented by P1(t(m−1), AE(m− 1)), and the point of the following photometry result is represented by P3(t(m+1), AE(m+1)). Referring to FIG. 6, the straight line passing through the point (the point P1 in this case) taking the smaller one of the output AE(m− 1) and AE(m+1), and the point P2 is acquired as L1=at +b. The straight line passing through the point (the point P3 in this case) taking the larger one of the output AE1 or AE3, having the inclination −a is acquired as L2.

By calculating the intersection of the lines L1 and L2, a flicker peak timing t_peak can be approximately calculated. When the result of the flicker detection in step S118 is a 100-Hz flicker (100 Hz in step S118), a flicker peak occurs at intervals of 10 milliseconds represented by t_peak+m*10 (in milliseconds, where m denotes an arbitrary natural number).

Returning to FIG. 3, in step S119, the CPU 104 performs the main exposure on the image sensor 101 at the first timing t_peak+m*10 reached in a state where various image capturing preparations are completed after execution of the image capturing operation by the user. According to the present embodiment, to prevent unevenness in brightness in the vertical direction of an image captured through main image capturing, the CPU 104 controls the exposure period of the image sensor 101 based on the flicker peak timing.

Likewise, when a 120-Hz flicker is detected in step S118 (120 Hz in step S118), a flicker peak occurs at intervals of about 8.33 milliseconds represented by t_peak+m*8.33 (in milliseconds, where m denotes an arbitrary natural number). Therefore, in step S120, the CPU 104 performs the main exposure in synchronization with the peak timing t_peak+ m*8.33 of the flicker by using a method similar to that in step S119. The above-described processing in steps S119 and S120 is referred to as the flickerless image capturing function. After a recording image is captured through the execution of the flickerless image capturing function in steps S119 and S120, the processing returns to steps S104 and S109, respectively. Then, the CPU 104 restarts live view display. When no flicker is detected (DC in step S118), the processing proceeds to step S121. In step S121, the CPU 104 performs the main exposure without adjusting the timing of the exposure period. Then, the processing returns to step S114.

Although, in the descriptions above, the CPU 104 detects a peak timing of the light amount change of the flicker (at which the light amount is maximized) and controls the exposure period of the image sensor 101 based on the detected peak timing, the present invention is not limited thereto. The flickerless image capturing function of the camera main body 100 according to the present embodiment may perform the main exposure in accordance with the timing (bottom timing) at which the light amount of the subject changing by the flicker is minimized.

As described above, the camera main body 100 according to the present embodiment performs the flicker detection operation not only when the flicker detection operation is performed by the user but also immediately before main image capturing for capturing a recording image is performed. When a flicker is detected, the CPU 104 can suitably set the charge accumulation period for reducing the influence of the flicker during live view display after image capturing while executing the flickerless image capturing function in accordance with the feature point of the light amount change of the detected flicker.

The above-described flicker detection operation in steps S105, S110, and S115 has been an operation for directly issuing a flicker detection instruction. However, for example, the flicker detection operation may be performed in association with an operation (instruction) for changing the display content of the display 103.

(Flickerless Image Capturing Function During Live View Display)

Figure 7:
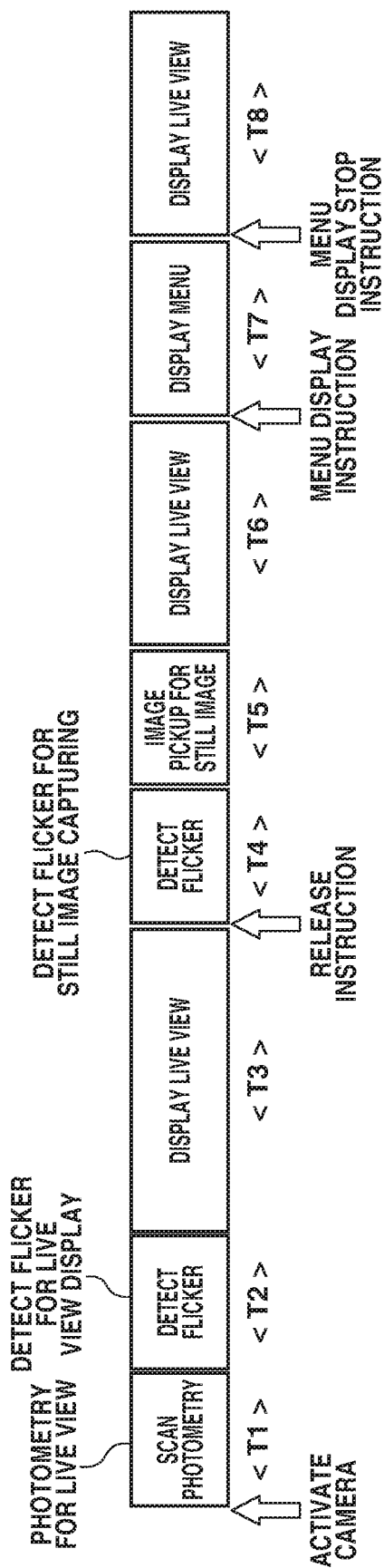
FIG. 7 illustrates a timing chart related to a flickerless image capturing operation during live view display according to the first embodiment of the present invention.

The timing will be describe in detail below at which each operation is performed in a case of performing flickerless image capturing during live view display according to the present embodiment. The basic operation is based on the above-described processing according to the flowchart illustrated in FIG. 3. FIG. 7 illustrates a timing chart related to the flickerless image capturing operation during live view display according to the first embodiment of the present invention. The timing chart illustrated in FIG. 7 premises a case where live view display is started when power of the camera main body 100 is turned on. Each operation illustrated in FIG. 7 is performed when the camera main body 100 and each apparatus connected to the camera main body 100 operate according to an instruction of the CPU 104. In the following descriptions, the description about the entity which performs each operation will be omitted.

Referring to FIG. 7, when power of the camera main body 100 is turned on to activate each part of the camera main body 100, the CPU 104 performs the scan type photometry method (scan photometry) at the timing T1. The scan photometry is a method for determining the optimum exposure by performing photometry based on a plurality of images (signals) prepared in accordance with a plurality of predetermined exposures. More specifically, according to the present embodiment, the CPU 104 performs photometry on a plurality of images captured with a predetermined exposure by using the image sensor 101 (to calculate the luminance value) and calculates the difference value from a predetermined target luminance value for each luminance value. The CPU 104 determines the optimum exposure (proper exposure) to be used in the image acquisition for live view based on the combination of the calculated and the target luminance values having the smallest absolute value of the difference therebetween.

At the timing T2, the CPU 104 performs the flicker detection operation. At the timing T3, the CPU 104 display the live view on the display 103. In this case, when capturing the image to be used for live view display, the CPU 104 performs the exposure control based on the result of the scan photometry previously performed and the result of the flicker detection to display the live view with the reduced influence of the flicker.

Subsequently, upon detection of the image pickup instruction issued when the user operates the image pickup instruction unit 110 during live view display, the CPU 104 interrupts the current live view display and, at the timing T4, performs the flicker detection operation again. Then, at the timing T5, the CPU 104 performs flickerless image capturing (main image capturing) based on the result of the flicker detection performed at the timing T4. The method for the flicker detection operation and the method for flickerless image capturing are as described above, and redundant descriptions thereof will be omitted. In the flicker detection operation performed at the timing T4, the CPU 104 detects the light amount change period and the flicker peak timing of the flicker (in accordance with the presence or absence of a flicker).

The CPU 104 performs the flicker detection operation at the timing T4 in a case where the flickerless image capturing function is preset to ON in the camera main body 100. Therefore, in a case where the flickerless image capturing function is preset to OFF, the CPU 104 performs subject image pickup (main subject image capturing) for capturing a still image while omitting the flicker detection operation at the timing T4.

Upon completion of main image capturing, then at the timing T6, the CPU 104 performs live view display on the display 103 again. In live view display at the timing T6, the CPU 104 performs the exposure control based on the result of the last flicker detection to perform live view display with the reduced influence of the flicker. More specifically, in the camera main body 100 according to the present embodiment, the exposure control for live view display is updated based on the result of the flicker detection operation last performed. In other words, during live view display, the camera main body 100 according to the present embodiment determines the exposure for live view display to reduce the influence of the flicker each time the flicker detection operation is newly performed.

In the example case, at the timings T7 and T8, the user operates the image pickup setting input unit 111 during live view display to issue a menu display instruction for displaying various setting items. In this case, the CPU 104 stops (interrupts) live view display upon issuance of the menu display instruction by the user and, at the timing T7, displays an arbitrary menu (setting screen) according to a user's operation on the display 103. Upon issuance of a menu display stop instruction by the user, then at the timing T8, the CPU 104 performs live view display again.

The flicker detection operation when the live view mode is the simulation mode will be described below. As described above, in the flicker detection operation according to the present embodiment, the CPU 104 detects the presence or absence of a flicker, the light amount change period, and a flicker peak timing. Therefore, the detection accuracy of the flicker detection operation degrades if saturated and underexposure regions exist in the image to be used for the flicker detection.

As an example situation where saturated and underexposure regions are likely to occur, there is a case where the exposure conditions are changed by a user's manual operation. This case is equivalent to a state where the exposure correction has been performed on the proper exposure previously acquired. When the live view mode is the simulation mode, the CPU 104 performs the flicker detection operation without reflecting the user-set exposure correction to the control values (luminance values) as the reference for the exposure control. In other words, even when the live view mode is the simulation mode, the CPU 104 performs the exposure control for the flicker detection operation regardless of the user-set exposure.

The luminance value to be used for the flicker detection operation is calculated regardless of the preset photometry mode in order to prevent the photometry result from changing according to the photometry mode. Although, in the present embodiment, the CPU 104 uses the average luminance value as a result of performing photometry on the entire image on an average basis, the CPU 104 may use the average luminance value based on the output of the region to be used for the flicker detection operation.

As described above, to prevent the occurrence of saturated and underexposure regions, it is preferable to perform the flicker detection operation without reflecting the exposure correction. However, in particular, in order to accurately detect the peak timing in the flicker detection operation, it is desirable to reduce saturated regions as much as possible. Accordingly, in the camera main body 100 according to the present embodiment, the CPU 104 detects saturated regions with reference to a luminance-related histogram. If saturated regions are detected, the CPU 104 may set the exposure in the flicker detection operation to reduce the influence of the saturation.

Summarizing the above-described configuration, the CPU 104 acquires the luminance value to be used for the exposure control for live view display according to the preset photometry mode. In this case, when the live view mode is the simulation mode, the CPU 104 performs the exposure control for live view in accordance with the user-set exposure conditions (more specifically, the CPU 104 shifts the luminance value to be used for the exposure control by the amount corresponding to the exposure correction). On the other hand, in the flicker detection operation, the CPU 104 calculates the luminance value by using a predetermined method regardless of the preset photometry mode and the live view mode, and performs the exposure control when capturing an image for flicker detection based on the luminance value. The CPU 104 detects saturated and underexposure regions based on a luminance histogram when calculating the luminance value for flicker detection operation. If saturated and underexposure regions are detected, the CPU 104 corrects the luminance value to reduce the saturated and underexposure regions.

Figure 8:
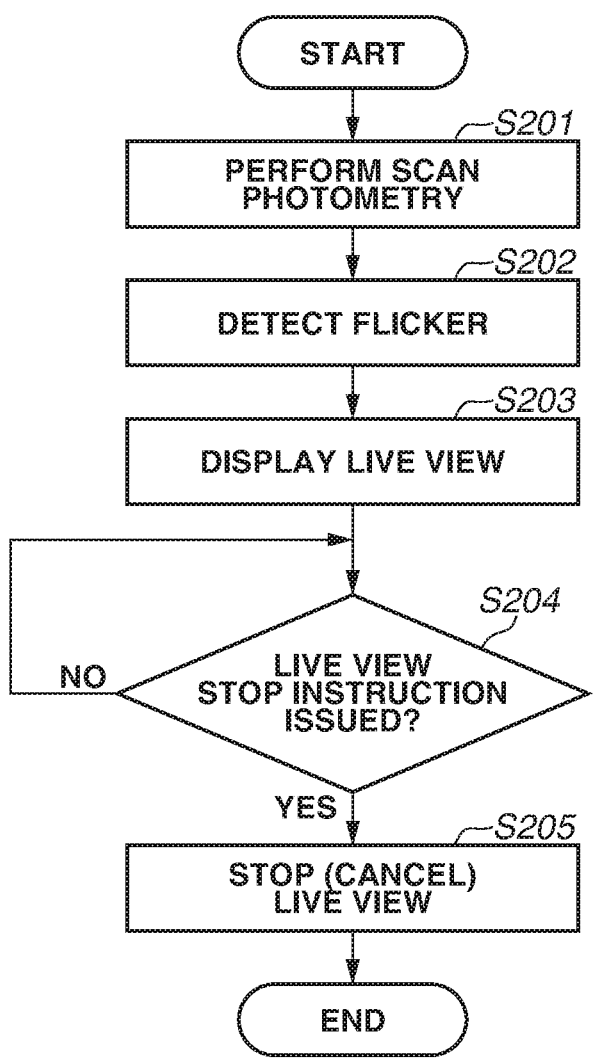
FIG. 8 is a flowchart illustrating processing related to a flicker detection operation during live view display according to the first embodiment of the present invention.
Figure 9:
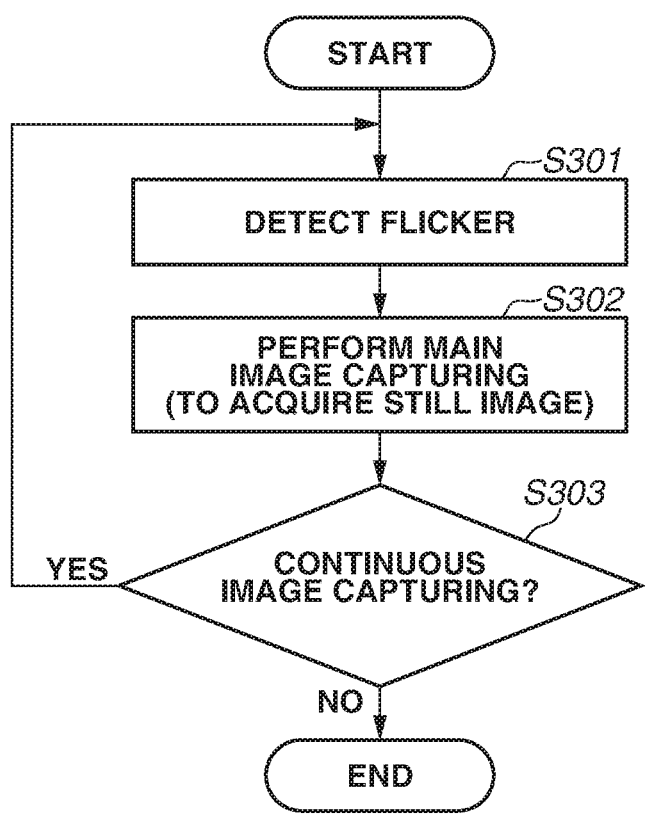
FIG. 9 is a flowchart illustrating image capturing processing during live view display according to the first embodiment of the present invention.

Processing based on the timing chart illustrated in FIG. 7 will be described below with reference to the flowcharts illustrated in FIGS. 8 and 9. The flowcharts illustrated in FIGS. 8 and 9 premise a case where the flickerless image capturing function is preset to ON in the camera main body 100 and where live view display is started when power of the camera main body 100 is turned on. FIG. 8 is a flowchart illustrating processing related to the flicker detection operation during live view display according to the first embodiment of the present invention.

When the CPU 104 starts live view display processing upon issuance of a live view start instruction (turning on power of the camera main body 100 or other operations for starting the live view), then in step S201, the CPU 104 performs the scan photometry and calculates the exposure conditions for achieving the proper exposure.

In step S202, the CPU 104 performs the flicker detection operation. In step S203, the CPU 104 performs the exposure control based on the result of the flicker detection in step S202 and, based on the exposure conditions for reducing the influence of the flicker, starts live view display on the display 103.

In step S204, the CPU 104 determines whether the user performs an operation requiring to stop (interrupt) live view display (live view stop operation). When the CPU 104 determines that the user performs a live view stop operation (YES in step S204), the processing proceeds to step S205. In step S205, the CPU 104 stops (interrupts) the current live view display. On the other hand, when the CPU 104 determines that the user does not perform a live view stop operation (NO in step S204), the processing repeats step S204.

Live view stop operations include a subject image pickup instruction, a menu display instruction, and an image reproduction instruction. Although the above-described flicker detection operation is also included in live view stop operations, the live view is subjected to a frame stop when a flicker detection operation instruction is issued. More specifically, a live view stop operation according to the present embodiment is an operation for stopping either the acquisition of an image for live view or the update of the live view image currently displayed on the display 103.

The following descriptions will be made on the premise that the live view stop operation determined in step S204 is a subject image pickup instruction. FIG. 9 is a flowchart illustrating image capturing processing during live view display according to the first embodiment of the present invention. After live view display is stopped, then in step S301, the CPU 104 performs the flicker detection operation to detect the presence or absence of a flicker, the light amount change period, and the flicker peak timing.

In step S302, the CPU 104 performs main image capturing based on the result of the flicker detection in step S301 and the previously acquired information about the proper exposure to capture a still image (recording image). When a flicker is detected in step S301, the CPU 104 performs image capturing (flickerless image capturing) in accordance with the flicker peak timing. On the other hand, when no flicker is detected in step S301, the CPU 104 performs image pickup regardless of the flicker peak timing.

In step S303, the CPU 104 determines whether the image pickup instruction by the user is continued, and a continuous image capturing instruction is issued. When the CPU 104 determines that the continuous image capturing instruction is issued (YES in step S303), the processing returns to step S301. The CPU 104 performs the flicker detection again. When the CPU 104 determines that the continuous image capturing instruction is not issued (NO in step S303), the CPU 104 ends the image capturing processing. In this case, the processing returns to step S203 illustrated in FIG. 8, and the CPU 104 resumes live view display.

If the flicker detection operation between continuous image capturing frames is configured to detect only the peak timing without detecting the light amount change period of the flicker, the continuous frame capturing frame rate (interval of continuous main image capturing) can be reduced. This is because the probability that the light amount change period of the flicker changes is low in a short period during continuous image capturing. On the contrary, it is desirable to detect the flicker peak timing each time the CPU 104 performs subject image capturing. This is because the peak of the light amount gradually changes because of a minute deviation from a theoretical value of the commercial power frequency. The flicker peak timing can be detected based on a plurality of images equivalent to one light amount change period of the flicker. Therefore, the CPU 104 needs to drive the image sensor 101 at 600 fps and repeat a cycle of the charge accumulation and readout operations six times, thus capturing the plurality of the images. When the prevention of the frame rate reduction is given priority in continuous image capturing, the CPU 104 may not perform the flicker detection operation for each image pickup in continuous image capturing.

When the live view stop operation determined in step S204 is a menu display instruction or an image reproduction instruction, the CPU 104 may determine, in processing newly provided, whether an instruction for continuing menu display and image reproduction is issued. When the continuation instruction is not issued, the processing returns to step S203. In addition, when the live view stop operation determined in step S204 is a flicker detection operation, the CPU 104 may determine, in processing newly provided, whether the instruction for the flicker detection operation by the user is continued. When the instruction is not continued, the processing returns to step S203. In either case, the camera main body 100 is configured to perform the exposure control for live view display based on the latest flicker detection result.

The camera main body 100 according to the present embodiment can perform the flicker detection operation regardless of the ON/OFF state of the flickerless image capturing function. More specifically, according to the present embodiment, when live view display is started, the CPU 104 performs the flicker detection operation (step S102) even when the flickerless image capturing function is OFF. This processing is intended to prevent the quality of live view display from being degraded by the influence of a flicker when live view display is started. The flicker detection operation (steps S105, S110, and S115) by the user request can be performed even when the flickerless image capturing function is OFF. This aims for reducing the possibility that image capturing is performed in a state where the presence or absence of a flicker cannot be determined. This configuration enables the user to easily determine the presence or absence of a flicker without changing the image capturing function. On the contrary, according to the present embodiment, to prevent the increase in the release time lag, the CPU 104 does not perform the flicker detection operation (S118) according to the user's image capturing operation when the flickerless image capturing function is OFF.

An image pickup system according to a second embodiment of the present invention will be described below with reference to FIGS. 10 to 13. The basic configuration of the image pickup system centering on the camera main body 100 is almost identical to that according to the above-described first embodiment, and redundant descriptions thereof will be omitted. The present embodiment differs from the first embodiment in the exposure control method related to the flicker detection operation.

Figure 10:
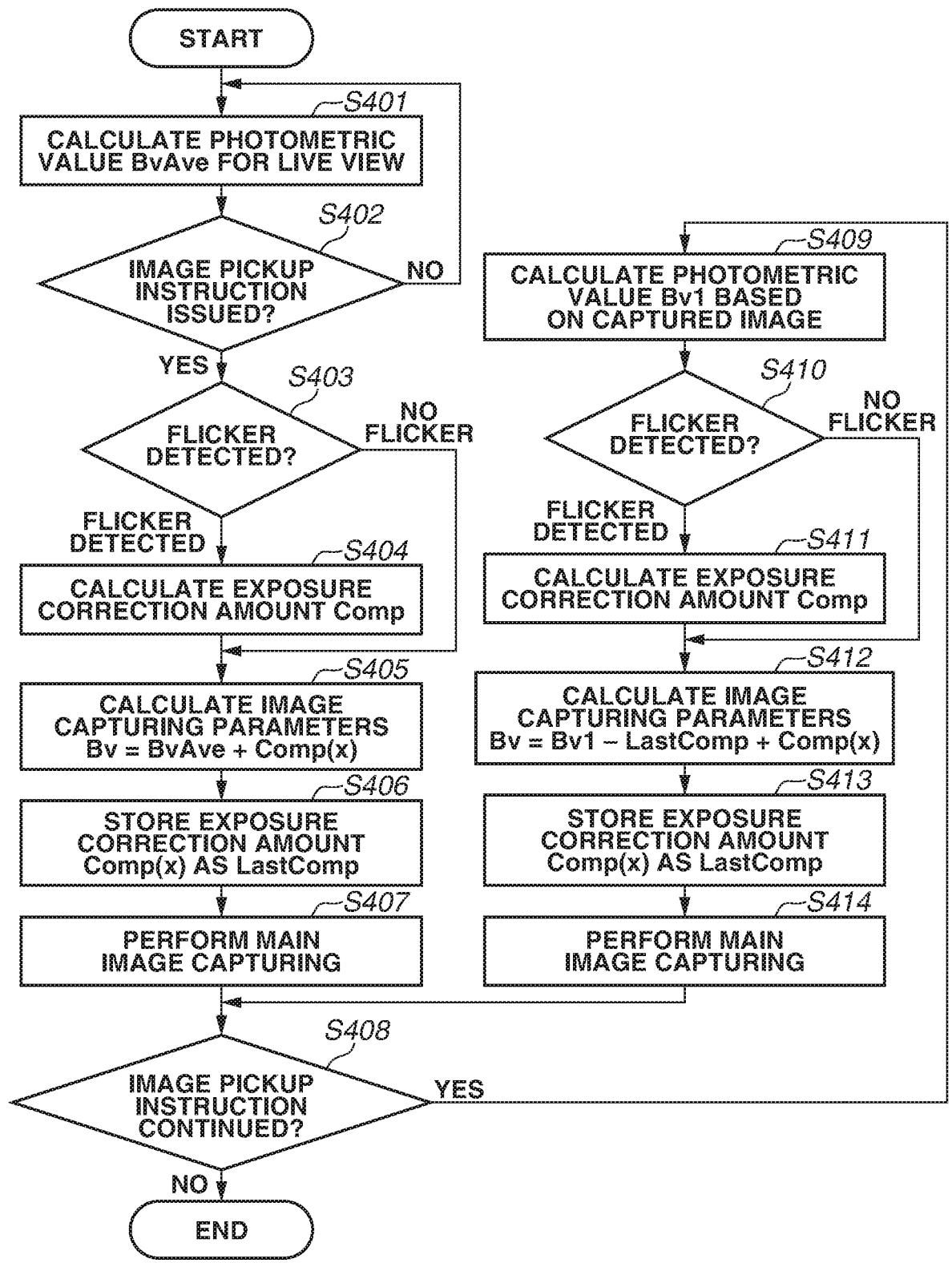
FIG. 10 is a flowchart illustrating flickerless image capturing processing in a case where a flickerless image capturing function is turned on, according to a second embodiment of the present invention.

FIG. 10 is a flowchart illustrating flickerless image capturing processing in a case where the flickerless image capturing function is ON, according to the second embodiment of the present invention. FIG. 10 is a flowchart illustrating various types of processing on the assumption of a case where main image capturing is performed during live view display. When power of the camera main body 100 is turned on, then in step S401, the CPU 104 captures an image by using the image sensor 101 and performs the photometry operation based on the image to calculate a photometry value BvAve.

Figure 11:
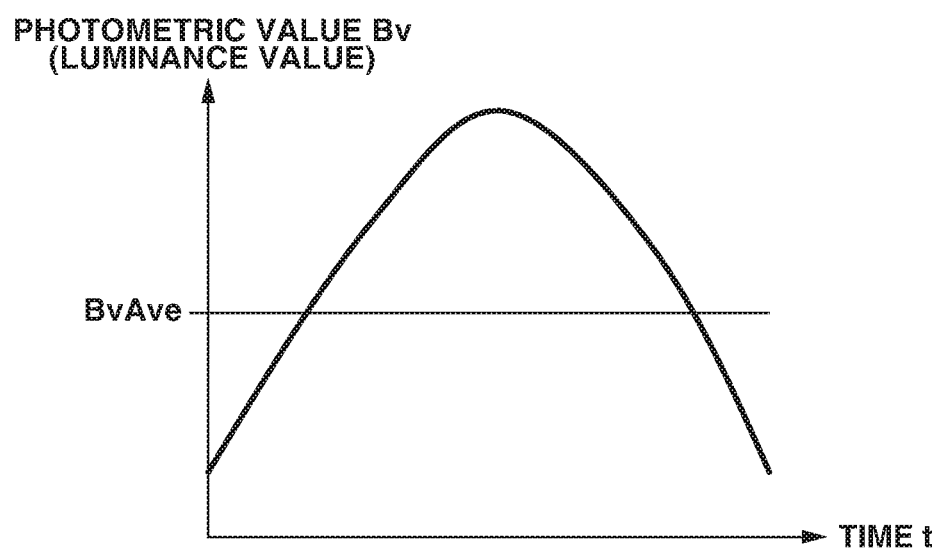
FIG. 11 illustrates a method for calculating, when a flicker exists, a photometry value (luminance value) in accordance with the light amount change period of the flicker.

FIG. 11 illustrates a method for calculating, when a flicker exists, the photometry value (luminance value) in accordance with the light amount change period of the flicker. To prevent unevenness in brightness in an image because of the influence of the flicker, the charge accumulation period of the image sensor 101 is made longer than one light amount change period of the flicker when capturing a live view image. The photometry value acquired in this case is an average photometry value BvAve as a result of averaging the light amount changes by the flicker, as illustrated in FIG. 11.

In step S402, the CPU 104 determines whether an image pickup instruction is issued by a user request. When an image pickup instruction is not detected (NO in step S402), the processing returns to step S401. On the other hand, when an image pickup instruction is issued (YES in step S402), the processing proceeds to step S403.

Figure 12:
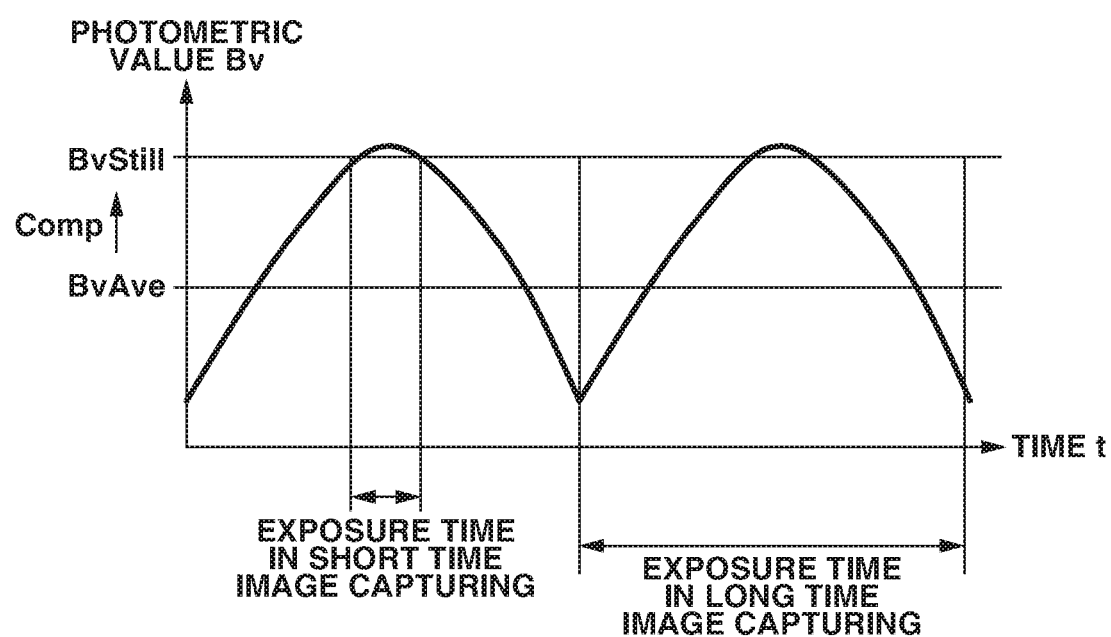
FIG. 12 illustrates a relation between a light amount change period and an exposure time of a flicker.

In step S403, the CPU 104 performs the flicker detection operation by using a method similar to that in the above-described first embodiment to determine whether a flicker is detected. When a flicker is detected (FLICKER DETECTED in step S403), the processing proceeds to step S404. In step S404, the CPU 104 calculates an exposure correction amount Comp according to the light amount change period of the flicker and the exposure time in image pickup. The following describes the necessity of correcting the photometry value when a flicker is detected, with reference to FIG. 12. FIG. 12 illustrates a relation between the light amount change period of the flicker and the exposure time.

As described above, in flickerless image capturing, the CPU 104 sets the exposure period by using the image sensor 101 based on the flicker peak timing. When the exposure time is short (i.e., in short-time image capturing at a high shutter speed), the light amount in the vicinity of the flicker peak timing is averaged. In this case, a luminance value BvStil corresponding to the exposure time in image capturing becomes more overexposure than the average photometry value BvAve. Therefore, the image brightness will become unnatural even if the CPU 104 performs subject image capturing under the exposure conditions set in accordance with the average photometry value BvAve.

According to the present embodiment, to prevent the brightness of an image captured in flickerless image capturing from becoming unnatural, the CPU 104 corrects the photometry value based on the exposure correction amount Comp in accordance with the exposure time in image pickup. The difference between the luminance value and the average photometry value BvAve corresponding to the exposure time in image capturing decreases with increasing exposure time. Therefore, the present embodiment is configured to achieve the optimum exposure according to the exposure time by using the variable exposure correction amount Comp. FIG. 13 illustrates a method for calculating an exposure correction amount according to the second embodiment of the present invention.

In step S405, the CPU 104 calculates the shutter speed (exposure time) Tv, the aperture value Av, and the ISO sensitivity as exposure conditions for main image capturing based on the photometry value BvAve acquired in step S401. The photometry value By to be used when calculating these exposure conditions is calculated based on the following Formula (2).

$$Bv = BvAve + Comp(X) \quad (2)$$

(X) is determined according to the value of the shutter speed (exposure time) Tv based on the data illustrated in FIG. 13. In step S406, for reference in the subsequent processing, the CPU 104 stores the exposure correction amount Comp(X) under an alias LastComp in a predetermined area of the recording unit 112. In step S407, the CPU 104 performs main image capturing under the exposure conditions based on the exposure correction amount calculated in step S404, to capture a still image (recording image).

When a flicker is detected, the CPU 104 performs subject image capturing in accordance (synchronization) with the flicker peak timing (flickerless image capturing). On the other hand, when a flicker is not detected, the CPU 104 performs subject image capturing regardless of the flicker peak timing.

In step S408, the CPU 104 determines whether the image pickup instruction (image capturing request) from the user is continued. When the image pickup instruction is continued (YES in step S408), the processing proceeds to step S409. On the other hand, when the CPU 104 determines that the image pickup instruction is not continued (NO in step S408), the CPU 104 ends a series of the image capturing processing.

In step S409, the CPU 104 calculates the photometry value based on the recording image (still image) previously captured in the main image capturing and stores the photometry value as a photometry value Bv1. In step S410, the CPU 104 performs the flicker detection operation. As described above in the first embodiment, the CPU 104 may perform only the peak timing detection in the flicker detection operation in step S410.

When a flicker is detected (FLICKER DETECTED in step S410), the processing proceeds to step S411. In step S411, the CPU 104 calculates the exposure correction amount Comp. On the other hand, when no flicker is detected (NO FLICKER in step S410), the processing proceeds to step S412.

The exposure correction amount Comp calculated in step S411 is the exposure correction amount for the averaged photometry value BvAve. Therefore, if the photometry value is calculated by Bv=Bv1+Comp(X), like the Formula (2) based on the exposure correction amount, the exposure correction will be performed in a duplicated way. More specifically, the photometry value Bv1 is calculated based on an image captured in a state where the average photometry value BvAve is corrected based on the exposure correction amount LastComp in the last main image capturing. Therefore, the exposure correction will be performed in a duplicated way.

According to the present embodiment, therefore, to remove the influence of the exposure correction amount LastComp in the last main image capturing, in step S412, the CPU 104 calculates the photometry value By based on the following Formula (3).

$$Bv=Bv1-LastComp+Comp(X) \qquad (3)$$

Even when performing continuous image capturing in flickerless image capturing during live view display, this configuration makes it possible to prevent the exposure correction from being performed in a duplicated way in the second and subsequent image pickups.

Processing in subsequent steps S413 to S414 is identical to the processing in steps S406 to S407, respectively, redundant descriptions thereof will be omitted. When the image pickup instruction is continued (YES in step S408), the CPU 104 repeats the processing in steps S409 to S414. When no flicker is detected in the flowchart illustrated in FIG. 10, the CPU 104 needs to perform each piece of processing assuming that the exposure correction amount Comp and the last exposure correction amount LastComp are zero.

According to the present embodiment, adopting the above-described configuration enables the camera main body 100 to effectively prevent from becoming unnatural the brightness of an image captured through subject image capturing when performing flickerless image capturing during live view display.

An image pickup system according to a third embodiment of the present invention will be described below with reference to FIGS. 14A to 16B. The basic configuration of the image pickup system centering on the camera main body 100 is almost identical to that of the above-described first embodiment, and redundant descriptions thereof will be omitted. The present embodiment differs from the above-described first embodiment in the flicker detection operation for each of lenses with different aperture drive methods.

An absolute aperture drive and a relative aperture drive as aperture control for each lens according to the present embodiment will be described below. The absolute aperture drive refers to control in which, when driving the aperture up to a certain target aperture value, it is necessary to once set the open area amount of the aperture 202 to a maximum aperture before driving the aperture 202 up to the open area amount corresponding to the target aperture value. This control is performed for the following reason. In terms of the aperture stop accuracy, the aperture drive accuracy can be stably maintained by once opening the aperture and then driving the aperture up to the target value, because of the influence of inverting backlash arising when changing the aperture drive direction.

On the other hand, the relative aperture drive refers to control in which, when driving the aperture up to a certain target aperture value, it is not necessary to once open the aperture before driving the aperture until the open area amount corresponding to the target aperture value is achieved. In the relative aperture drive, the imaging lens prestores correction data for reducing inverting backlash. Therefore, in terms of the aperture stop accuracy, the aperture accuracy can be stably maintained, without once opening the aperture, by correcting the aperture drive based on the correction data. For details on the correction data, any known technique may be used to correct the aperture drive.

Figure 14:
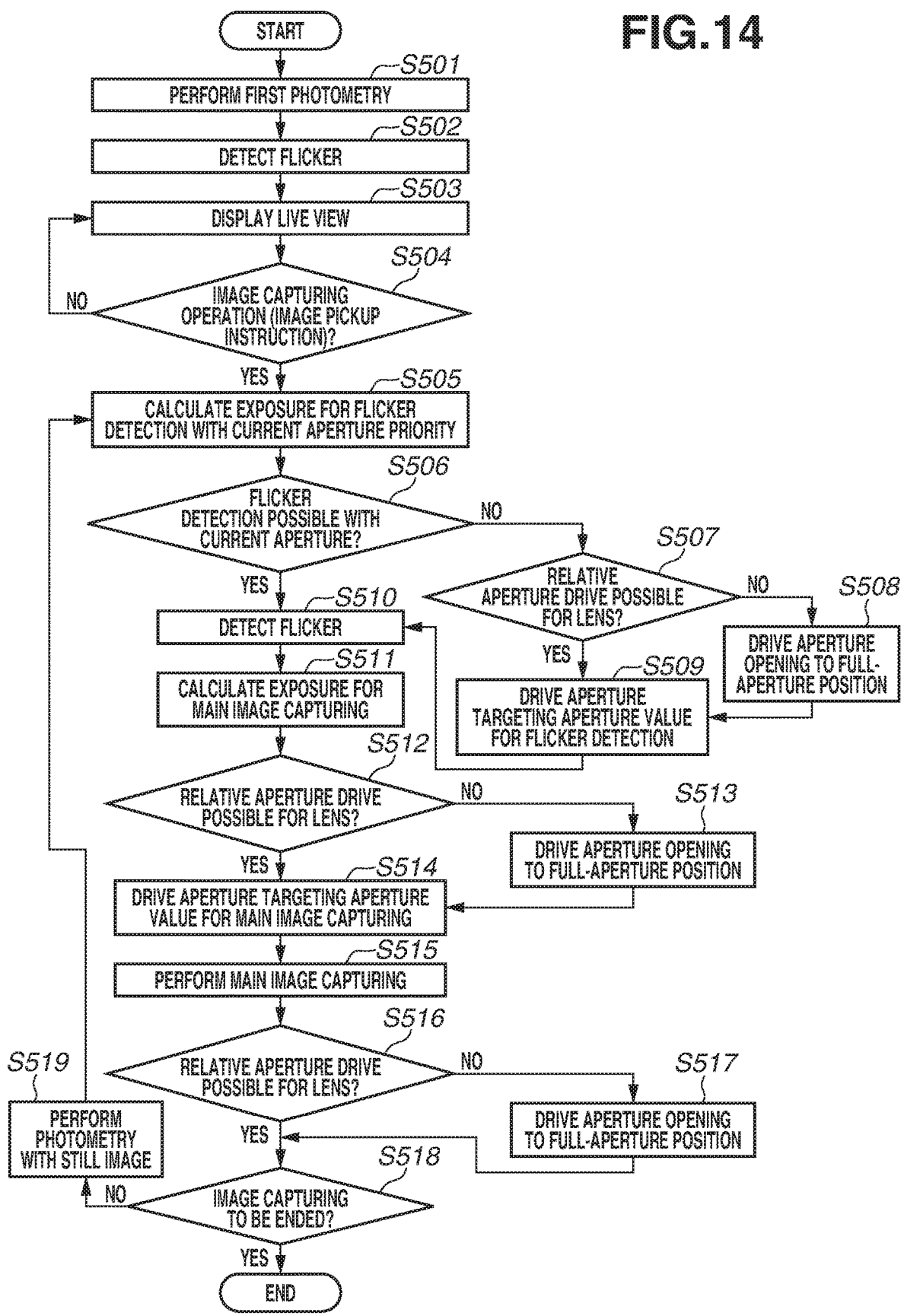
FIG. 14 is a flowchart illustrating image capturing processing for performing flicker detection during live view display according to a third embodiment of the present invention.

FIG. 14 is a flowchart illustrating image capturing processing for performing the flicker detection during live view display according to the third embodiment of the present invention. For processing identical to the image capturing processing illustrated in FIG. 3 according to the above-described first embodiment, out of processing illustrated in FIG. 14, redundant descriptions will be omitted.

Processing in steps S501 to S503 is identical to the processing in steps S101 to S102 and step S104, S109, or S114 in the above-described first embodiment, and redundant descriptions thereof will be omitted. Like the above-described first embodiment, in step S503, the exposure time (or charge accumulation period) when capturing an image for live view based on the result of the flicker detection processing in step S502 is different. During live view display, the CPU 104 performs the photometry operation at predetermined intervals based on the image for live view to suitably control the exposure conditions for the live view image.

In step S504, the CPU 104 determines whether an image pickup instruction is issued upon execution of an image capturing operation by the user (for example, on the image pickup instruction unit 110). When the CPU 104 determines that the image pickup instruction is not issued (NO in step S504), the processing returns to step S503. On the other hand, when the CPU 104 determines that the image pickup instruction is issued (YES in step S504), the processing proceeds to step S505.

In step S505, the CPU 104 performs the exposure control for flicker detection with the current aperture value setting given priority. In the processing in step S505, the CPU 104 performs the exposure control with the current aperture given priority based on the photometry result for the image for live view captured in step S503 or the photometry result for the recording image (still image) to be captured in step S519 (described below). More specifically, in step S505, the CPU 104 calculates the exposure conditions when performing the flicker detection operation with the current state of the aperture 202 (i.e., current aperture value) given priority.

As described above in the first embodiment, in the flicker detection operation, the CPU 104 drives the image sensor 101 to continuously perform the accumulation and readout operations at 600 fps, i.e., at intervals of about 1.667 milliseconds (for example, 12 times). The CPU 104 performs these continuous accumulation operations under the same exposure conditions. For example, if the current aperture value is an extremely large value (i.e., small aperture), the proper exposure may not be achieved with an exposure time (charge accumulation period) of 1.667 milliseconds even with a large ISO sensitivity. In this case, since the accumulation operation is performed at 1.667-ms intervals, a dark image not suitable for the flicker detection will be captured. Alternatively, even if an image is captured with an exposure time longer than 1.667 milliseconds, the flicker detection cannot be accurately performed based on this image. In such a case, since the flicker detection cannot be performed if the aperture value remains unchanged, the exposure conditions allowing the flicker detection operation cannot be set with the current aperture fixed. Therefore, in such a case, the CPU 104 calculates the exposure conditions accompanied by the change of the current aperture value as exposure conditions for flicker detection.

In step S506, based on the result of the calculation in step S505, the CPU 104 determines whether the flicker detection operation can be performed without changing the current aperture value of the aperture 202. More specifically, in step S506, if the flicker detection operation cannot be accurately performed without changing the current aperture value based on the calculation result in step S505, the CPU 104 determines that the flicker detection cannot be performed with the current aperture value. When the CPU 104 determines that the flicker detection can be performed with the current aperture value (YES in step S506), the processing proceeds to step S510. On the other hand, when the CPU 104 determines that the flicker detection cannot be performed with the current aperture value (NO in step S506), the processing proceeds to step S507.

In step S507, based on the in-focus position and lens information (for example, lens identifier (ID)) acquired by communicating with the LPU 203, the CPU 104 determines whether the imaging lens 200 attached to the camera main body 100 is a lens with the relative aperture drive. When the CPU 104 determines that the imaging lens 200 is a lens with the relative aperture drive (YES in step S507), the processing proceeds to step S509. On the other hand, when the CPU 104 determines that the imaging lens 200 is not a lens with the relative aperture drive (NO in step S507), i.e., the imaging lens 200 is a lens with the absolute aperture drive, the processing proceeds to step S508. The relative aperture drive and the absolute aperture drive for the imaging lens 200 will be described in detail below with reference to FIGS. 15A, 15B, 16A, and 16B.

Since the imaging lens 200 is a lens with the absolute aperture drive, then in step S508, the CPU 104 drives the opening of the aperture 202 to the open position. Then, the processing proceeds to step S509. In step S509, using the aperture value calculated in step S505 as a target value, the CPU 104 drives the aperture 202 by using the aperture drive unit 205 to achieve the open area amount corresponding to the target value.

Processing in step S510 is identical to the processing in step S118 according to the above-described first embodiment, and redundant descriptions thereof will be omitted. In step S511, the CPU 104 calculates the exposure conditions for main image capturing based on the photometry result for the live view image captured in step S503. Processing in steps S512 to S514 is almost identical to the processing in steps S507 to S509, respectively, and redundant descriptions thereof will be omitted. In the processing in steps S512 to S514, the target aperture value is the aperture value for main image capturing calculated in step S511.

Processing in step S515 is identical to the processing in step S119, S120, or S121 according to the above-described first embodiment, and redundant descriptions thereof will be omitted. Only when a flicker is detected, the CPU 104 performs main image capturing (flickerless image capturing) in synchronization with the flicker peak timing. On the other hand, when no flicker is detected, the CPU 104 performs main image capturing regardless of the flicker peak timing.

In step S516 (like steps S507 and S512), the CPU 104 determines whether the imaging lens 200 is a lens with the relative aperture drive. When the imaging lens 200 is a lens only with the absolute aperture drive, the CPU 104 drives the aperture 202 to the open position after main image capturing. This processing is intended to save the time and effort to drive the aperture 202 to the open position in the next and subsequent main image capturing to reduce the release time lag. Processing in step S517 is identical to the processing in steps S509 and S513, and redundant descriptions thereof will be omitted.

In step S518, the CPU 104 determines whether the image pickup instruction by the user is continued. More specifically, in step S518, the CPU 104 determines whether image capturing is completed. When the CPU 104 determines that image capturing is completed (YES in step S518), the CPU 104 ends the image capturing processing. On the other hand, when the CPU 104 determines that image capturing is not completed (NO in step S518), the processing proceeds to step S519. In step S519, the CPU 104 performs the photometry processing based on the recording image (still image) captured in main image capturing in step S515. Then, the processing returns to step S505, and the CPU 104 repeats the processing in step S505 and the subsequent processing.

Figure 15A:
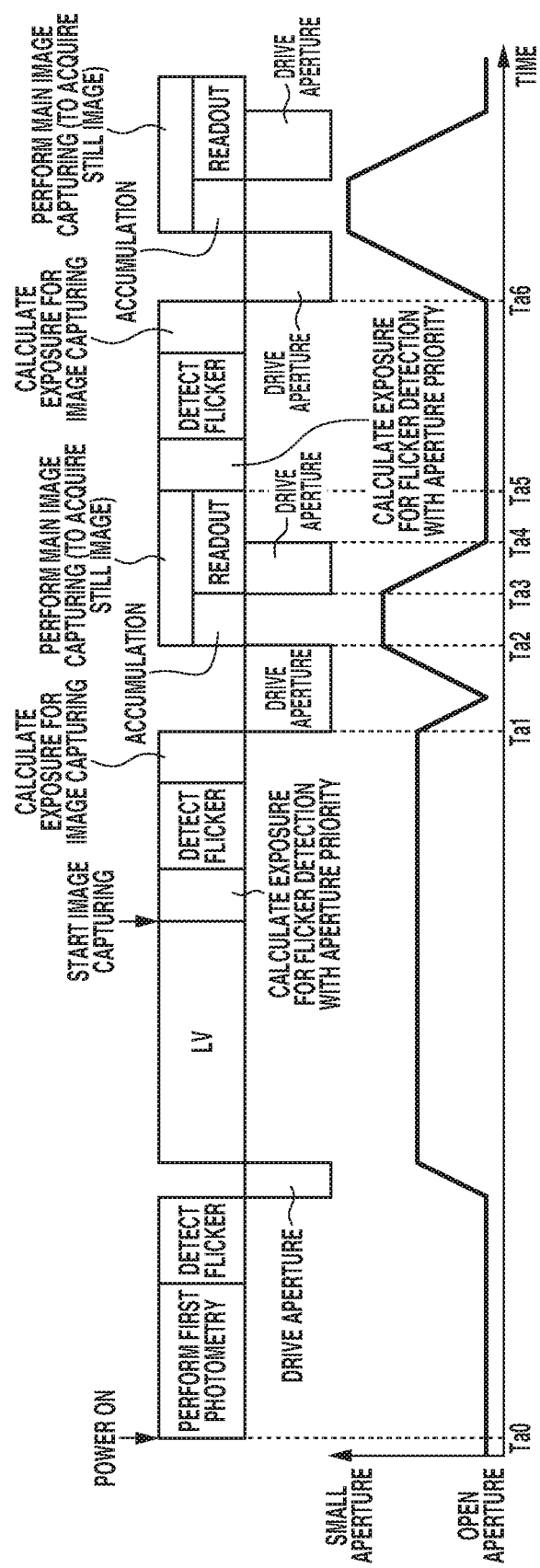

The above-described image capturing processing when the imaging lens 200 is a lens with the absolute aperture drive and image capturing processing when the imaging lens 200 is a lens with the relative aperture drive will be described below with reference to the timing charts illustrated in FIGS. 15A, 15B, 16A, and 16B. FIGS. 15A and 15B illustrate timing charts and aperture states related to the flickerless image capturing processing for each of lenses with different aperture driving methods according to the third embodiment of the present invention. FIG. 15A illustrates an operation when the imaging lens 200 is a lens with the absolute aperture drive, and FIG. 15B illustrates an operation when the imaging lens 200 is a lens with the relative aperture drive.

Referring to FIGS. 15A and 15B, the CPU 104 performs similar processing at similar timings since the time Ta0 and Tb0 when power of the camera main body 100 is turned on till the time Ta1 and Tb1 when the exposure calculation for main image capturing is completed.

The following describes operations when the imaging lens 200 is a lens with the absolute aperture drive. Referring to FIG. 15A, at the time Ta1 when the exposure calculation for main image capturing is completed, the CPU 104 starts the drive of the aperture 202 to the open position. Then, the CPU 104 completes the drive of the aperture 202 to the target value by the time Ta2. Since the time Ta2 to till the time Ta3, the CPU 104 performs the accumulation (exposure) operation for main image capturing. Between the time Ta3 and Ta4, the CPU 104 reads the image signal corresponding to the last accumulation operation and parallelly drives the aperture 202 to the open position again. This is because, as described above, it is necessary to open the aperture 202 for the following image capturing.

When the image pickup instruction by the user is continued, then at the time Ta5, the CPU 104 performs the exposure calculation for flicker detection by giving priority to the aperture value (open aperture value) for a state where the aperture 202 is at the open position to perform flicker detection. Since the present embodiment is based on an example case where the flicker detection operation is possible with the open aperture value, the drive operation of the aperture 202 does not occur at this timing. At the time Ta6 when the exposure calculation for main image capturing is completed, the CPU 104 starts the drive of the aperture 202. When the drive of the aperture 202 to the target value is completed, the CPU 104 performs the following image capturing (still image capturing). Subsequently, the CPU 104 repeats these operations while the image pickup instruction is continued.

The following describes operations when the imaging lens 200 is a lens with the relative aperture drive. Referring to FIG. 15B, at the time Tb1 when the exposure calculation for main image capturing is completed, the CPU 104 starts the drive of the aperture 202. Then, the CPU 104 continues the drive of the aperture 202 up to the target aperture value for main image capturing till the time Tb2, without driving the aperture 202 to the open position. Since the time Tb2 till the time Tb3, the CPU 104 performs the accumulation (exposure) operation for main image capturing. Then, the CPU 104 cancels the drive of the aperture 202 leaving the aperture value unchanged without driving the aperture 202. This is because, when the imaging lens 200 is a lens with the relative aperture drive, it is not necessary to leave the aperture 202 open in accordance with the following main image capturing.

When the image pickup instruction by the user is continued, then at the time Tb5, the CPU 104 performs the exposure calculation for flicker detection with the current aperture value given priority to perform the flicker detection. Since the present embodiment is based on an example case where the flicker detection operation remains possible with the current aperture value, the drive operation of the aperture 202 does not occur at this timing. At the time Tb6 when the exposure calculation for main image capturing is completed again, the CPU 104 starts the drive of the aperture 202 to perform the following main image capturing (still image capturing). Subsequently, the CPU 104 repeats these operations while the image pickup instruction is continued.

Figure 16A:
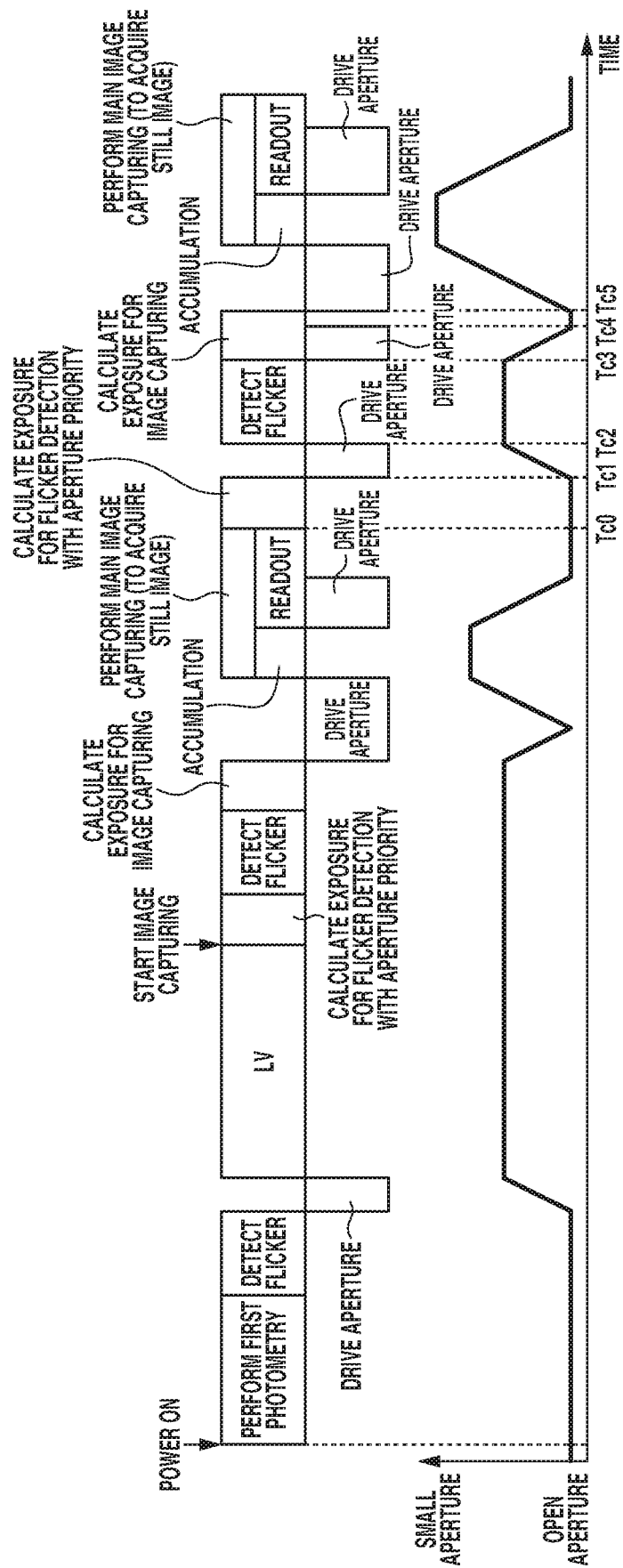
FIGS. 16A and 16B illustrate timing charts and aperture states related to a case of driving an aperture in a flicker detection operation for each of lenses with different aperture driving methods according to the third embodiment of the present invention.
Figure 16B:
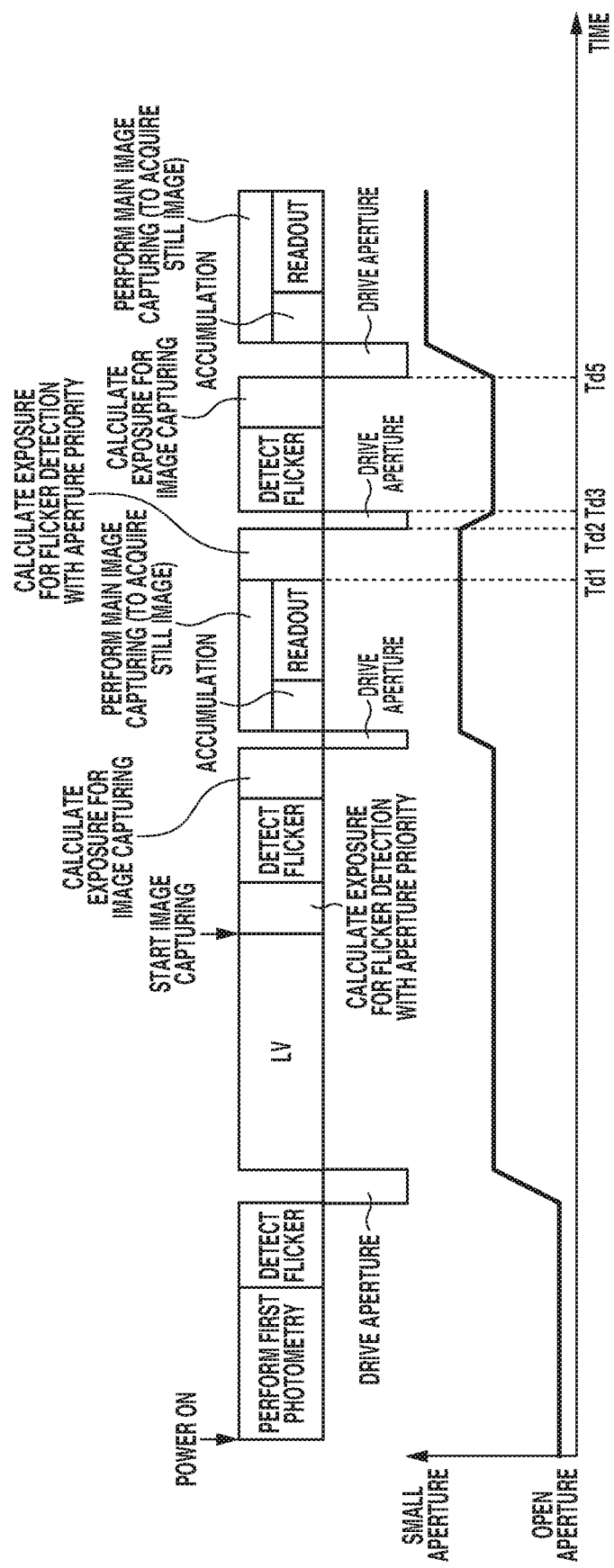

FIGS. 16A and 16B illustrate timing charts and aperture states related to a case of driving the aperture 202 in the flicker detection operation for each of lenses with different aperture driving methods according to the third embodiment of the present invention. FIG. 16A illustrates an operation when the imaging lens 200 is a lens with the absolute aperture drive, and FIG. 16B illustrates an operation when the imaging lens 200 is a lens with the relative aperture drive.

The following describes operations when the imaging lens 200 is a lens with the absolute aperture drive, with reference to FIG. 16A. The operations up to the first main image capturing are identical to the above-described operations illustrated in FIG. 15A, and redundant descriptions thereof will be omitted. As illustrated in FIG. 16A, at the time Tc0 when main image capturing is completed, the CPU 104 performs the exposure calculation for flicker detection with the open aperture value given priority. Since the exposure conditions provide excessive brightness to the subject, there assumes a case where the flicker detection cannot be performed with the open aperture value.

In this case, at the time Tc1, the CPU 104 starts the drive of the aperture 202 to the open position. Then, the CPU 104 completes the drive of the aperture 202 by the time Tc2 when the flicker detection operation is started. At the time Tc2, the CPU 104 performs the flicker detection operation. Between the time Tc3 and Tc4, the CPU 104 drives the aperture 202 again to the open position. As described above, this is the aperture drive operation for the following image capturing. Then, at the time Tc5 when the exposure calculation for main image capturing is completed, the CPU 104 starts the drive of the aperture 202. Upon completion of the drive of the aperture 202, the CPU 104 performs the following main image capturing (still image capturing). Subsequently, the CPU 104 repeats these operations while the image pickup instruction is continued.

The following describes operations when the imaging lens 200 is a lens with the relative aperture drive, with reference to FIG. 16B. The operations up to the first main image capturing are identical to the above-described operations illustrated in FIG. 15B, and redundant descriptions thereof will be omitted. As illustrated in FIG. 16B, at the time Td1 when main image capturing is completed, the CPU 104 performs the exposure calculation for flicker detection with the current aperture value given priority. Since the exposure conditions provide excessive darkness to the subject, there assumes a case where the flicker detection cannot be performed with the current aperture value.

In this case, the CPU 104 starts the drive of the aperture 202 at the time Td2 and continues the drive of the aperture 202 till the time Td3 when the aperture value allowing the flicker detection operation is achieved. After performing the flicker detection operation at the time Td3, the CPU 104 does not drive the aperture 202 but stops the drive of the aperture 202 leaving the aperture value unchanged. This is because, since the relative aperture drive is possible, it is not necessary to drive the aperture 202 to the open position for the following image capturing. Then, at the time Td5 when the exposure calculation for main image capturing is completed, the CPU 104 starts the drive of the aperture 202 in accordance with the aperture value for main image capturing. Upon completion of the drive of the aperture 202, the CPU 104 performs the following main image capturing (still image capturing). Subsequently, the CPU 104 repeats these operations while the image pickup instruction is continued.

As described above, the camera main body 100 and the imaging lens 200 according to the present embodiment enables the optimum aperture drive in accordance with the flicker detection and the flickerless image capturing operation according to the type of the imaging lens 200. More specifically, regardless of the lens type, the CPU 104 determines whether the flicker detection operation is possible with the current aperture value. According to the result of the determination, the CPU 104 performs control to perform the optimum aperture drive according to the presence or absence of the aperture drive and the type of the imaging lens 200.

This configuration makes it possible to accurately perform the flicker detection operation regardless of the type of the imaging lens 200, and quickly perform the flicker detection operation and flickerless image capturing according to the type of imaging lens 200.

Figure 17:
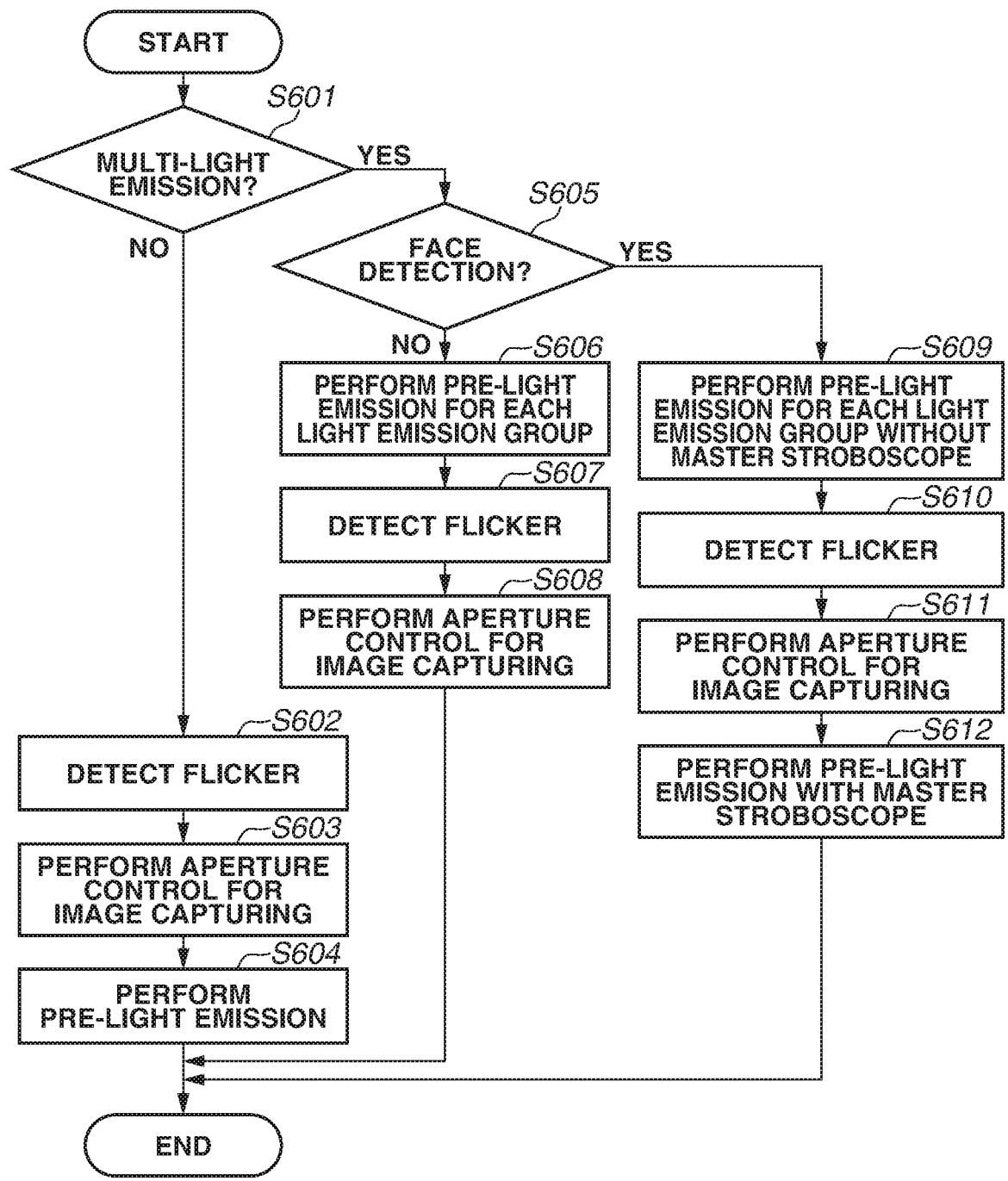
FIG. 17 is a flowchart illustrating flicker detection processing in light emission image capturing according to a fourth embodiment of the present invention.
Figure 19:
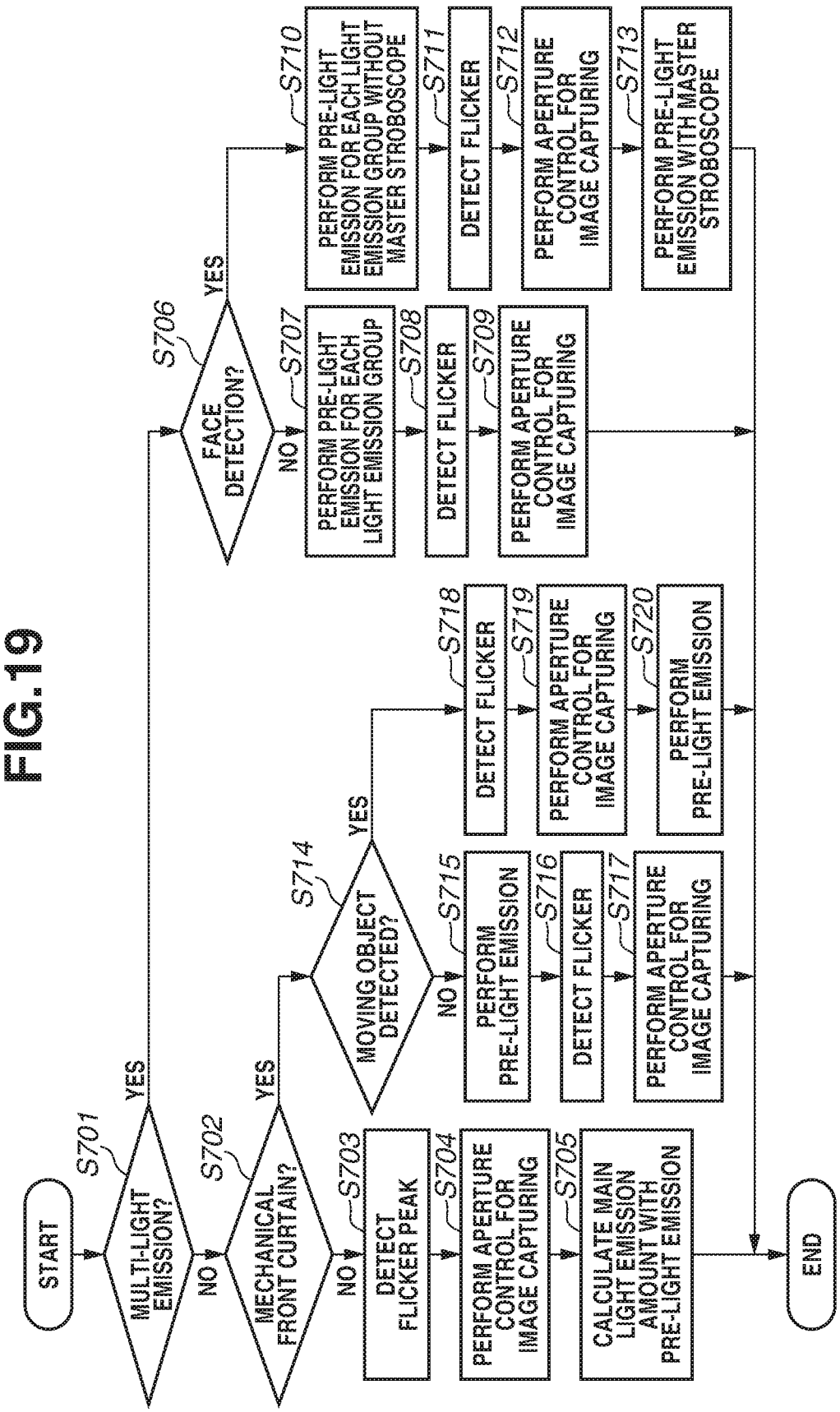
FIG. 19 is a flowchart illustrating flicker detection processing in light emission image capturing in consideration of a difference in the shutter driving method and a result of moving object detection according to the fourth embodiment of the present invention.

The following describes the image pickup system according to the third embodiment of the present invention, with reference to FIGS. 17 to 19. The basic configuration of the image pickup system centering on the camera main body 100 is almost identical to that of the above-described first embodiment, and redundant descriptions thereof will be omitted. The present embodiment will be specifically described below centering on a case where the CPU 104 performs light emission image capturing by using the built-in stroboscope 114 or the external stroboscope 300 in addition to the flicker detection operation during live view display according to the above-described first embodiment.

FIG. 17 is a flowchart illustrating flicker detection processing in light emission image capturing according to a fourth embodiment of the present invention. The flowchart illustrated in FIG. 17 indicates image capturing preparation processing performed during the time period since the time when an image pickup instruction is issued by the user till the time when main image capturing is performed assuming a case where flickerless image capturing is performed during live view display. For example, according to the above-described first embodiment, the image capturing preparation processing corresponds to the processing in step S118 illustrated in FIG. 3.

In step S601, the CPU 104 determines whether the setting in light emission image capturing is the multi-light emission mode using a plurality of light emitting devices. The multi-light emission mode is a light emission mode in which a subject is illuminated by a plurality of light emitting devices and light emission image capturing is performed in main image capturing. When the multi-light emission mode is enabled (ON), the CPU 104 performs, immediately before main image capturing, pre-light emission by using a plurality of light emitting devices divided into a plurality of light emission groups and performs light amount control calculation for calculating the main light emission amount. When the CPU 104 determines that the setting in light emission image capturing is not the multi-light emission mode (NO in step S601), the processing proceeds to step S602. On the other hand, when the CPU 104 determines that the setting in light emission image capturing is the multi-light emission mode (YES in step S601), the processing proceeds to step S605.

In step S602, the CPU 104 performs the flicker detection operation and, particularly at this timing, detects at least the flicker peak timing. The flicker detection operation method according to the present embodiment is identical to that according to the above-described first embodiment, and redundant descriptions thereof will be omitted.

In step S603, the CPU 104 performs the aperture control for main image capturing (image capturing aperture control). In this case, immediately before main image capturing, the CPU 104 adjusts the aperture diameter of the aperture 202 to achieve the aperture value for main image capturing based on the aperture value for live view display. More specifically, the CPU 104 transmits an aperture change request to the LPU 203 of the imaging lens 200 and controls the aperture drive unit 205 according to an instruction of the LPU 203 to change the open area amount (aperture position) of the aperture 202.

In step S604, the CPU 104 performs pre-light emission using a light emitting device and, based on the result of pre-light emission, calculates the light emission amount (main light emission amount) in main image capturing (light amount control calculation). The light emitting device in step S604 is assumed to be the external stroboscope 300. In the processing in step S604, before main image capturing, the CPU 104 issues a pre-light emission instruction based on a predetermined light emission amount to the SPU 301 included in the external stroboscope 300. Then, the CPU 104 calculates the main light emission amount based on images captured by performing subject image capturing in pre-light emission according to the preliminary light emission instruction. As described above, in a case where multi-light emission is not performed by the light emitting device, the CPU 104 performs operations in order of the flicker peak timing detection, the image capturing aperture control, and the pre-light emission.

As the method for calculating the main light emission amount accompanied by pre-light emission (light amount control calculation), any known methods are applicable. According to the present embodiment, the CPU 104 compares a non-light emission image captured in the non-light emission state of the light emitting device with a pre-light emission image captured in the pre-light emission state of the light emitting device to calculate the reflected light component of the subject, and calculates the main light emission amount by associating prestored data with the calculated reflected light component.

Although, in the present embodiment, the CPU 104 performs the light amount control calculation to calculate the main light emission amount at the timing when the non-light emission image and all pre-light emission images are captured (for example, after step S604 and steps S606 and S612 (described below)), the present invention is not limited thereto. For example, if the light amount control calculation can be completed before main image capturing, it is not necessary to perform the light amount control calculation immediately after completion of pre-light emission. The timings of pre-light emission image acquisition and the light amount control calculation may be timings other than the above-described configuration.

When the CPU 104 determines that the setting in light emission image capturing is the multi-light emission mode (YES in step S601), the processing proceeds to step S605. In step S605, the CPU 104 determines whether face region detection processing (face detection) is currently being performed. In face detection, the CPU 104 applies pattern matching predetermined based on the image for live view display and detects whether a face region is included in the image. In other words, performing the face detection enables determining whether the image pickup target subject is a person or an object other than a person. In face detection, the CPU 104 determines whether the subject is a person based on the evaluation value for evaluating the degree of matching with a pattern indicating the face region prestored in the camera main body 100.

When the CPU 104 determines that the face detection is not currently being performed (NO in step S605), the processing proceeds to step S606. On the other hand, when the CPU 104 determines that the face detection is currently being performed (YES in step S605), the processing proceeds to step S609. Processing in steps S606 to S612 corresponds to the processing for the multi-light emission mode.

In step S606, the CPU 104 performs pre-light emission by each light emission group of the light emitting devices to be used for multi-light emission and calculates the main light emission amount. The light emitting device included in a master stroboscope in the multi-light emission mode is the external stroboscope 300. A plurality of light emitting devices as other slave stroboscopes has a configuration almost identical to that of the external stroboscope 300. Communication (synchronization) control with an electric wave or light is possible for these light emitting devices. In the multi-light emission mode, the pre-light emission timing is differentiated for each light emission group.

Processing in subsequent steps S607 to S608 is identical to the processing in steps S602 to S603, and redundant descriptions thereof will be omitted. As described above, in a case where multi-light emission is performed by the light emitting device and face detection is not performed, the CPU 104 calculates the main light emission amount in the multi-light emission mode, detects the flicker peak timing, and finally performs the image capturing aperture control.

When the CPU 104 determines that the setting in light emission image capturing is the multi-light emission mode (YES in step S601) and that face detection is currently being performed (YES in step S605), the processing proceeds to step S609. In step S609, the CPU 104 performs pre-light emission by each light emission group in the multi-light emission mode and calculates the main light emission amount. However, unlike step S606, the CPU 104 does not perform pre-light emission for the group including the external stroboscope 300 directly attached to the camera main body 100. This is because the pre-light emission timing is differentiated between a light emission group performing front light emission and the other light emission groups, assuming that a subject is most likely to be illuminated from the front by a light emitting device directly attached to the camera main body 100. In the following descriptions, the light emission group including the light emitting device performing front light emission is referred to as a master stroboscope (group).

Processing in steps S610 and S611 is identical to the processing in steps S602 and S603, respectively, and redundant descriptions thereof will be omitted. Finally, in step S612, the CPU 104 performs pre-light emission by the group including the external stroboscope 300 directly attached to the camera main body 100 and calculates the main light emission amount in main image capturing.

The following describes the timing chart of each operation in the flowchart illustrated in FIG. 17, with reference to FIGS. 18A, 18B, and 18C. FIGS. 18A, 18B, and 18C are timing charts illustrating flicker detection processing in light emission image capturing according to the fourth embodiment of the present invention. Referring to FIGS. 18A, 18B, and 18C, "VD" indicates the timing of a vertical synchronization signal to be applied to the image sensor 101. The time period since the signal is once set to the Low level until it falls to the Low level again is the period required to capture an image for one frame of the live view. "APERTURE POSITION" is a visual form of the open area amount of the aperture 202. The upper position is closer to the opening state. "LIGHT EMISSION TIMING" indicates, for example, the light emission timing of the illumination light using a light emitting device such as the external stroboscope 300. The CPU 104 reads output signals of pixels configuring the image sensor 101 in synchronization with VD and repeats the control for resetting the integration value upon completion of signal readout, thus detecting changes of the luminance value of the subject.

FIG. 18A illustrates various control timings related to the flicker detection operation, the aperture drive, and the light emission operation of the light emitting device when the multi-light emission mode is disabled (OFF) (NO in step S601). In a situation as illustrated in FIG. 18A, the CPU 104 performs the flicker detection operation. Details of the flicker detection operation are as described above in the first embodiment, and redundant descriptions thereof will be omitted. VD is issued in accordance with the 600-fps drive period of the image sensor 101. The CPU 104 performs the flicker detection operation based on the result of integrating a total of 12 outputs.

Then, the CPU 104 performs control to change the aperture value from the aperture value (f1.8) for live view display (flicker detection) to the aperture value (f5.6) for main image capturing, and at the same time changes the drive control on the image sensor 101 for light amount control. Finally, the CPU 104 performs pre-light emission and calculates the main light emission amount based on the integration result (light amount control calculation). In the above-described control, when the multi-light emission setting is disabled (OFF) (i.e., when performing single light emission by a light emitting device), the CPU 104 performs pre-light emission immediately before image capturing after the aperture drive out of various control operations. This makes it possible to perform image capturing while preventing person's eye shutting.

FIG. 18B illustrates various control timings related to the flicker detection operation, the aperture drive, and the light emission operations by the light emitting devices when the multi-light emission mode is enabled (ON) and face detection is not currently being performed (NO in step S605).

In a situation as illustrated in FIG. 18B, the CPU 104 performs pre-light emission by each light emission group of a plurality of light emitting devices (slave stroboscopes EGr to BGr and master stroboscope AGr) performing multi-light emission, and calculates the main light emission amount based on the integration result (light amount control calculation). Then, the CPU 104 changes the drive control of the image sensor 101 to the drive control for flicker detection and performs the flicker detection operation. Upon completion of the flicker detection operation, the CPU 104 changes the aperture value from the aperture value for live view display (flicker detection) to the aperture value for main image capturing. This configuration, in which the flicker detection operation is performed immediately before main image capturing, makes it possible to prevent the influence of a flicker peak timing shift caused by the time difference between the flicker detection operation and main image capturing, thus achieving stable flickerless image capturing.

FIG. 18C illustrates various control timings related to the flicker detection operation, the aperture drive, and the light emission operations by the light emitting devices when the multi-light emission mode is enabled (ON) and face detection is currently being performed (YES in step S605).

In a situation as illustrated in FIG. 18C, the CPU 104 performs pre-light emission by each light emission group of a plurality of light emitting devices (slave stroboscopes EGr to BGr) performing multi-light emission, and acquires the integration result. At this timing, the CPU 104 does not perform pre-light emission by the external stroboscope 300 serving as the master stroboscope, and therefore has not yet completed the calculation of the main light emission amount.

Then, the CPU 104 changes the drive control of the image sensor 101 to the drive control for flicker detection and performs the flicker detection operation. Then, immediately before image capturing, the CPU 104 performs pre-light emission by the master stroboscope (external stroboscope 300) and calculates the main light emission amount based on the integration result and other integration results of pre-light emission previously performed by the light emitting devices serving as the other light emission groups (light amount control calculation). Upon completion of the flicker detection operation, the CPU 104 changes the aperture value from the aperture value for live view display (flicker detection) to the aperture value for main image capturing.

In this configuration, when a person is detected, the light emitting device serving as the master stroboscope performs pre-light emission immediately before main image capturing, and front light emission toward the person is performed immediately before main image capturing. This makes it possible to perform image capturing while preventing person's eye shutting. In addition, since the flicker detection operation is performed immediately before pre-light emission by the light emitting device serving as the master stroboscope, it is possible to prevent the influence of a flicker peak timing shift caused by the time lapse since the flicker detection, thus achieving stable flickerless image capturing.

Although, in the present embodiment, the timing of pre-light emission related to the light amount control calculation is controlled by using as the master stroboscope the light emission group including the external stroboscope 300 directly attached to the camera main body 100, the present invention is not limited thereto. For example, when performing multi-light emission, the user may specify the master stroboscope Gr. In this case, the light emission group including the light emitting device located in front of a person may be used as the master stroboscope (Gr).

The following describes each operation according to the difference in the shutter driving method and the presence or absence of detection of a moving object in a case where flickerless image capturing accompanied by light emission is performed during live view display, with reference to FIG. 19. FIG. 19 is a flowchart illustrating flicker detection processing in light emission image capturing in consideration of the difference in the shutter driving method and the result of the moving object detection according to the fourth embodiment of the present invention. Processing in step S701 illustrated in FIG. 19 is identical to the processing in step S601, and processing in steps S706 to S713 is identical to the processing in steps S605 to S612, respectively, and redundant descriptions thereof will be omitted.

When the multi-light emission setting is disabled (OFF) (NO in step S701), the processing proceeds to step S702. In step S702, the CPU 104 determines whether the shutter driving method in main image capturing is a method using a mechanical front curtain (mechanical front curtain method). According to the present embodiment, the shutter driving method in the charge accumulation period control on the image sensor 101 is classified into two methods. One method is what is called a mechanical front curtain method in which the travel timing of a first blade group (front curtain) and a second blade group (rear curtain), mechanical shading blades included in the shutter 102, is controlled to adjust the charge accumulation period of the image sensor 101 by using both the front and the rear curtains. The other method is what is called an electronic front curtain method in which the reset timings of the second blade group (rear curtain) included in the shutter 102 and the image sensor 101 are controlled to implement the operation equivalent to the function of the above-described front curtain through charge accumulation control on the image sensor 101. According to the present embodiment, the execution timing of each operation is differentiated according to the shutter driving method to prevent the increase in the time difference between the flicker detection operation and main image capturing, resulting from the increase in the release time lag occurring when the mechanical front curtain method is adopted.

If the shutter driving method is not the mechanical front curtain method (i.e., the shutter driving method is the electronic front curtain method) (NO in step S702), the processing proceeds to step S703. Processing in steps S703 to S705 is almost identical to the processing in steps S602 to S604, respectively, and redundant descriptions thereof will be omitted. On the other hand, when the shutter driving method is the mechanical front curtain method (YES in step S702), the processing proceeds to step S714. In step S714, the CPU 104 determines whether the amount of movement of the image pickup target subject is a predetermined amount or larger (i.e., the subject is a moving object). The moving object detection is performed by the CPU 104 based on a plurality of images captured in advance (or captured at this timing) by the image sensor 101. More specifically, the CPU 104 calculates a motion vector in the plurality of the images and, if the amount of movement of the subject based on the motion vector is a predetermined threshold value or larger, the CPU 104 detects that the subject is a moving object.

When a moving object is not detected (NO in step S714), the processing proceeds to step S715. In steps S715 to S717, the CPU 104 performs operations in order of pre-light emission by the external stroboscope 300 (and the light amount control calculation), the flicker detection operation, and the image capturing aperture control. Details of each operation are as described above, and redundant descriptions thereof will be omitted.

On the other hand, when a moving object is detected (YES in step S714), the processing proceeds to step S718. In steps S718 to S720, the CPU 104 performs operations in order of the flicker detection operation, the image capturing aperture control, and pre-light emission by the external stroboscope 300 (and the light amount control calculation). Details of each operation are as described above, and redundant descriptions thereof will be omitted.

By adopting the above-described configuration, the camera main body 100 according to the present embodiment can prevent the influence of the release time lag accompanying the operation of the shutter 102 on the flicker detection operation. When the subject is a moving object, the camera main body 100 according to the present embodiment performs pre-light emission immediately before main image capturing to minimize the time difference between pre-light emission and main image capturing accompanied by main light emission, thus reducing an image pickup failure resulting from the motion of the subject.

The present embodiment has been described above centering on control in light emission image capturing using the external stroboscope 300 or a similar external light emitting device. The above-described configuration is also applicable to light emission image capturing using the built-in stroboscope 114.

First Modification

Figure 20:
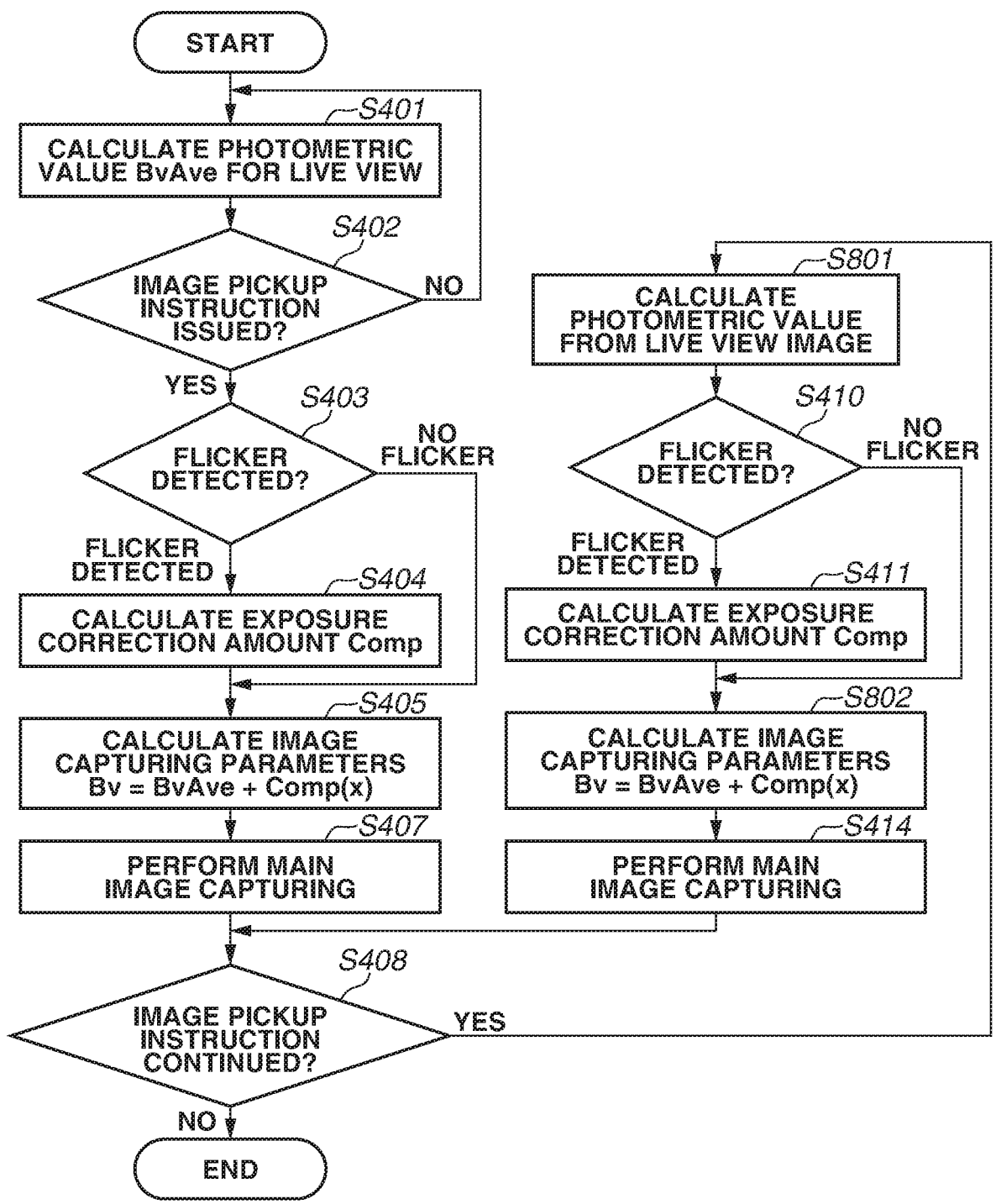
FIG. 20 is a flowchart illustrating flickerless image capturing processing in a case where the flickerless image capturing function is turned on, according to a first modification of the present invention.

The following describes a first modification of the above-described second embodiment, with reference to FIG. 20. FIG. 20 is a flowchart illustrating flickerless image capturing processing in a case where the flickerless image capturing function is ON, according to the first modification of the present invention. Processing illustrated in FIG. 20 differs from the processing illustrated in FIG. 10 in that processing in steps S406 and S413 is deleted, processing in step S801 is performed instead of step S409, and processing in step S802 is performed instead of step S412. Of the processing illustrated in FIG. 20, processing identical to the processing illustrated in FIG. 10 is assigned the same reference numerals as the processing illustrated in FIG. 10, and redundant descriptions thereof will be omitted.

According to the present modification illustrated in FIG. 20, in step S801 (like step S401), the CPU 104 calculates the photometry value BvAve based on the image for live view display.

In step S802 (like step S405), the CPU 104 calculates the exposure conditions (Tv, Av, and ISO sensitivity) for main image capturing based on the photometry value BvAve acquired in step S801.

As described above, according to the present modification, in the second and subsequent image pickups in continuous image capturing, the CPU 104 acquires the photometry value to be used when calculating the image capturing parameters (exposure conditions) for main image capturing, based on the image for live view display. In this case, as in the case of performing photometry by using a recording image (still image) captured in main image capturing, there is no possibility that the exposure correction amount is calculated in a duplicated way. Therefore, it is not necessary to calculate the exposure correction amount in the current image pickup by using the exposure correction amount used in the last image pickup. Therefore, if the configuration according to the present modification is adopted, it is possible, when performing flickerless image capturing during live view display, to effectively prevent the image brightness from becoming unnatural while restricting the increase in the processing load.

Second Modification

Figure 21:
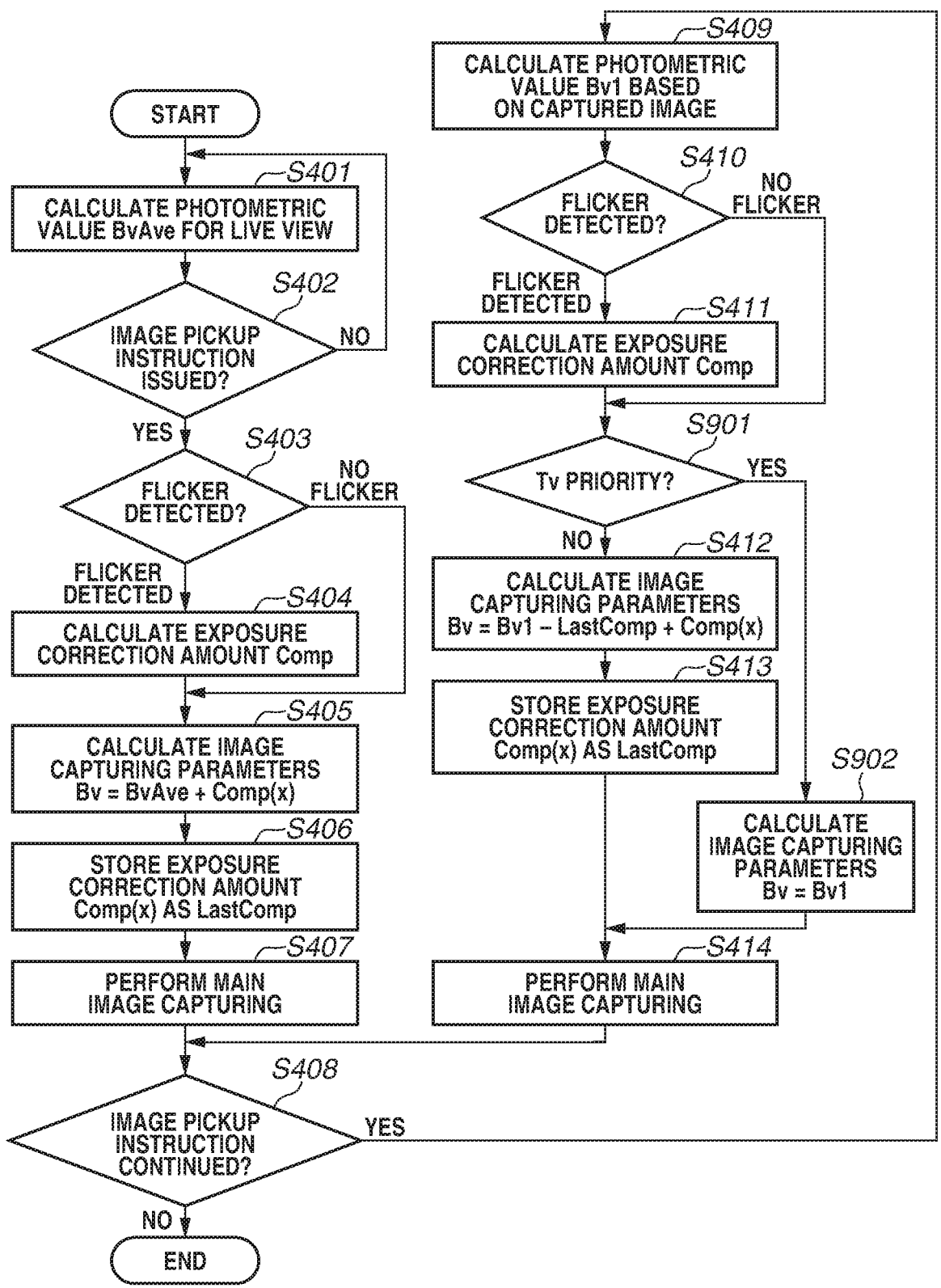
FIG. 21 is a flowchart illustrating flickerless image capturing processing in a case where the flickerless image capturing function is turned on, according to a second modification of the present invention.

The following describes a second modification of the above-described second embodiment, with reference to FIG. 21. FIG. 21 is a flowchart illustrating the flickerless image capturing processing in a case where the flickerless image capturing function is ON, according to the second modification of the present invention. Processing illustrated in FIG. 21 differs from the processing illustrated in FIG. 10 in that the processing in steps S901 and S902 is added. Of the processing illustrated in FIG. 21, processing identical to the processing illustrated in FIG. 10 is assigned the same reference numerals as the processing illustrated in FIG. 10, and redundant descriptions thereof will be omitted.

Like the second embodiment, the present modification adopts a configuration in which the value of the exposure correction amount Comp(x) changes according to the exposure time (shutter speed) Tv. In an image capturing mode in which Tv can be fixed (given priority), for example, in the shutter speed (Tv) priority mode, the quality of a captured image is not largely affected even if the exposure correction amount in each main image capturing in continuous image capturing remains unchanged for each of continuous image pickups. According to the present modification, therefore, the method for calculating the exposure conditions is differentiated according to whether an image capturing condition (for example, Tv priority mode) with fixed Tv, out of the exposure control values, (Tv priority) is set.

According to the present modification illustrated in FIG. 21, in step S901, the CPU 104 determines whether the current image capturing condition allows Tv to be preferentially set. More specifically, according to the present embodiment, the CPU 104 determines whether the current image capturing mode allows Tv to be set to a fixed value according to the user's manual setting.

When the CPU 104 determines that the current image capturing condition does not allow Tv to be preferentially set (NO in step S901), the processing proceeds to step S412. In step S412, the CPU 104 calculates the exposure conditions for main image capturing. On the other hand, when the CPU 104 determines that the current image capturing condition allows Tv to be preferentially set (YES in step S901), the processing proceeds to step S902. In step S902, assuming that the necessity for removing the influence of the exposure correction amount LastComp in the last main image capturing is low in the following main image capturing, the CPU 104 sets the photometry value By to Bv1 and calculates the exposure conditions for main image capturing based on the photometry value.

As described above, according to the present modification, when an image capturing condition in which Tv, out of the exposure conditions for main image capturing, is given priority is set, the CPU 104 calculates the exposure conditions for the following main image capturing without taking into consideration the exposure correction amount in the last main image capturing, in the second and subsequent image pickups in continuous image capturing. In this case, since Tv is preferentially determined, the influence on the image quality is small between images captured in continuous image capturing. Therefore, if the configuration according to the present modification is adopted, the CPU 104 calculates the exposure conditions for the current main image capturing (image capturing parameters) regardless of the exposure correction amount in the last main image capturing depending on the image capturing condition, thus reducing the processing load.

Third Modification

Figure 22:
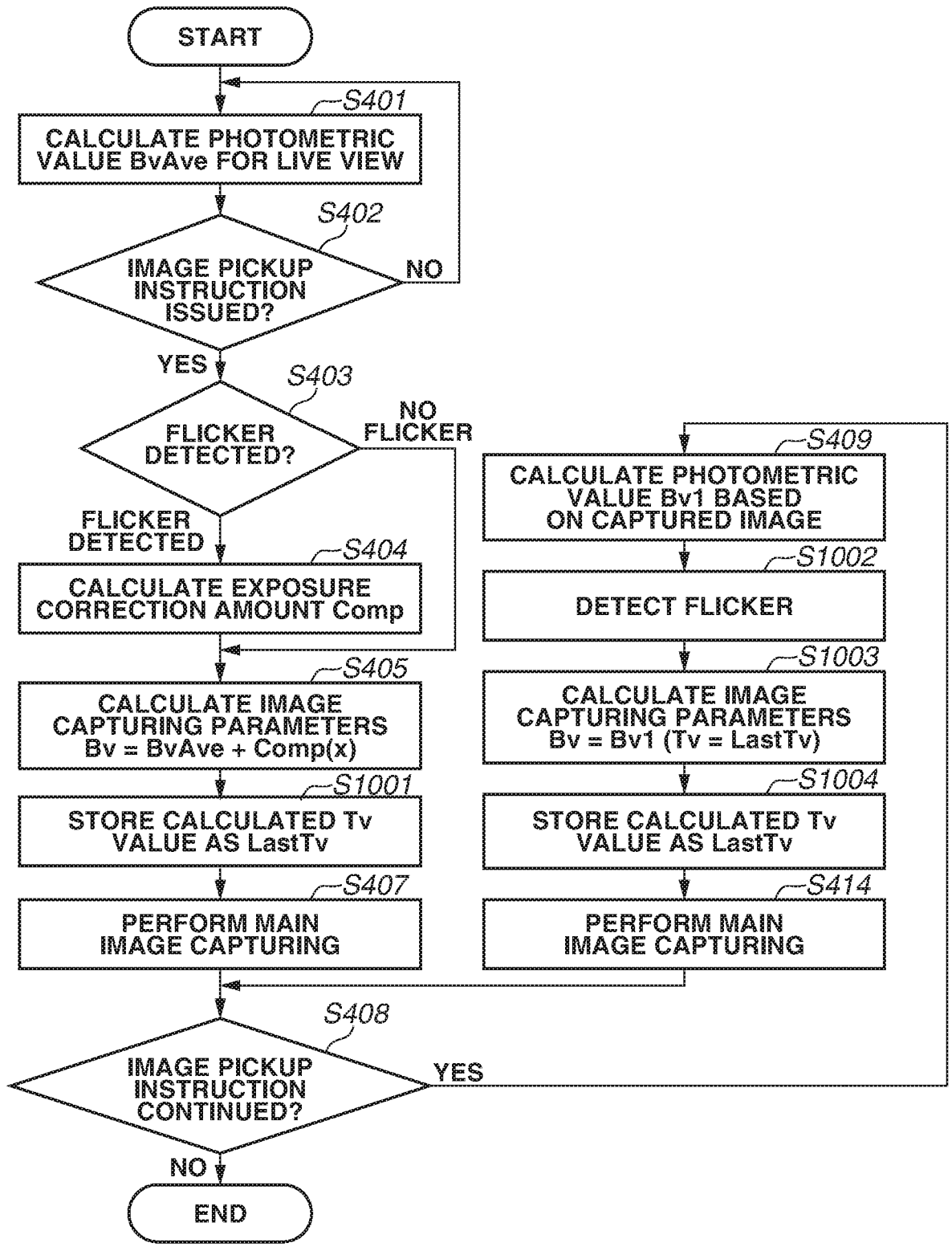
FIG. 22 is a flowchart illustrating flickerless image capturing processing in a case where the flickerless image capturing function is turned on, according to a third modification of the present invention.

The following describes a third modification of the above-described second embodiment, with reference to FIG. 22. FIG. 22 is a flowchart illustrating the flickerless image capturing processing in a case where the flickerless image capturing function is ON, according to the third modification of the present invention. Processing illustrated in FIG. 22 differs from the processing illustrated in FIG. 10 in that the processing in step S411 is deleted, and the processing in steps S1001, S1002, S1003, and S1004 is performed instead of steps S406, S410, S412, and S413, respectively. Processing identical to the processing illustrated in FIG. 10, out of processing illustrated in FIG. 22, is assigned the same reference numerals as the processing illustrated in FIG. 10, and redundant descriptions thereof will be omitted.

As illustrated in FIG. 22, in step S1001, the CPU 104 stores the shutter speed (exposure time) Tv(x), out of the exposure conditions calculated in step S405, under an alias LastTv in a predetermined area of the recording unit 112.

In step S1002, the CPU 104 performs the flicker detection operation by using the same method as step S403. In step S1002, there is no branch processing corresponding to the flicker detection result. More specifically, according to the present modification, in step S1002, the CPU 104 does not calculate the exposure correction amount regardless of the presence or absence of a flicker.

In step S1003, the CPU 104 sets the photometry value By to Bv1 and calculates the exposure conditions for main image capturing based on the photometry value. However, the CPU 104 sets the shutter speed Tv, out of the exposure conditions calculated in step S1003, as LastTv which corresponds to the shutter speed calculated for the last main image capturing. In step S1004, the CPU 104 stores the shutter speed Tv set for the current main image capturing under an alias LastTv in a predetermined area of the recording unit 112.

As described above, according to the present modification, in the second and subsequent image pickups in continuous image capturing, the CPU 104 calculates the exposure conditions for the following main image capturing by fixing the shutter speed Tv set first. In this case, since the shutter speed remains unchanged, the CPU 104 calculates the exposure conditions for the current main image capturing (image capturing parameters) regardless of the exposure correction amount in the last main image capturing, in the second and subsequent image capturing in continuous image capturing, thus reducing the processing load.

While the present invention has specifically been described based on the above-described embodiments and modifications, the present invention is not limited thereto but can be modified in diverse ways within the ambit of the appended claims. For example, although, in the above-described embodiments and modifications, the shutter speed, aperture value, and ISO sensitivity are used as the exposure conditions, exposure control values related to other elements may be added to the exposure conditions. For example, if the camera main body 100 or the imaging lens 200 includes a light attenuation unit for attenuating the amount of light incident to the image sensor 101, such as a normal density (ND) filter, the image pickup apparatus 100 may be configured to perform the exposure control in consideration of an exposure control value related to the density of the ND filter.

Although, in the above-described embodiments and modifications, the components of the image pickup system centering on the camera main body 100, such as the CPU 104 and the recording unit 112, operate in a collaborative way to control the overall operations of the image pickup apparatus 100, the present invention is not limited thereto. For example, a (computer) program according to each of the above-described flowcharts illustrated in FIGS. 3, 8, 9, 10, 14, 17, and 19 to 22 is prestored in a predetermined area of the recording unit 112. The CPU 104 executes the program to control the operations of the entire image pickup system. The program may be formed as an object code, a program executed by an interpreter, or script data supplied to an operating system (OS) as long as the program provides programmed functions. A recording medium for supplying the program may be, for example, a hard disk, a magnetic recording medium such as a magnetic tape, or an optical/magnetooptical recording medium.

In the above-described embodiments, an image pickup apparatus composed of the camera main body 100 as an image pickup apparatus main body and the imaging lens 200 separately formed, what is called a lens-interchangeable type image pickup apparatus, is used as an example of an image pickup apparatus according to the present invention. However, the present invention is not limited thereto. For example, an image pickup apparatus composed of a camera main body and an imaging lens integrally formed, what is called a lens-integrated type image pickup apparatus, may be used as an image pickup apparatus according to the present invention.

Although, in the above-described embodiments, a digital camera is used as an example of an image pickup apparatus according to the present invention, the present invention is not limited thereto. For example, the present invention is also applicable to a configuration applying an image pickup apparatus other than a digital camera, such as a portable device (a digital camera or a smart phone), a wearable terminal, or a security camera.

Other Embodiments

The present invention can also be achieved when a program for implementing at least one of the functions according to the above-described embodiments is supplied to a system or apparatus via a network or storage medium, and at least one processor in a computer of the system or apparatus reads and executes the program. In addition, the present invention can also be achieved by a circuit (for example, an application specific integrated circuit (ASIC)) for implementing at least one function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2018-125529, filed Jun. 29, 2018, No. 2018-125530, filed Jun. 29, 2018, No. 2018-125531, filed Jun. 29, 2018, No. 2018-125533, filed Jun. 29, 2018, No. 2018-125532, filed Jun. 29, 2018, and No. 2019-093204, filed May 16, 2019, which are hereby incorporated by reference herein in their entirety.

What is claimed is:

1. An image pickup apparatus including an image sensor and display unit configured to display a live view of images picked up by the image sensor, the image pickup apparatus comprising:

at least one processor or circuit configured to perform the operations of the following units:

detection unit configured to perform a flicker detection operation to detect flicker based on a plurality of images captured by the image sensor at predetermined intervals; and control unit configured to control the image sensor based on flicker information detected by the detection unit, wherein the detection unit is configured to perform first detection of the flicker detection operation at a time that is different from a time at which an image pickup preparation instruction is received and different from a time at which an image pickup instruction is received whilst live view images are displayed on the display unit, and perform second detection of the flicker detection operation according to the image pickup preparation instruction or the image pickup instruction by a user at a timing that is different from the time at which the first detection is performed, wherein the detection unit is configured to perform the first and the second detections in the case that a first setting for performing an image pickup in accordance with a predetermined timing of a light amount change of the flicker is preset to ON, and the detection unit is configured to perform the first detection without performing the second detection in the case that the first setting is preset to OFF, wherein, in the case that a flicker is detected in the first detection, the control unit is configured to control exposure of the image sensor in a charge accumulation period to reduce an influence of the flicker for live view display on the display unit after the first detection, and wherein, in the case that a flicker is detected in the second detection, the control unit is configured to control exposure of the image sensor for capturing a still image in accordance with a predetermined timing of a light amount change of the flicker.

2. The image pickup apparatus according to claim 1, wherein the detection unit is configured to perform third detection of the flicker detection operation before live view display is started, and wherein, in the case that a flicker is detected in the third detection, the control unit is configured to control the image sensor to achieve an charge accumulation period for reducing an influence of the flicker for live view display on the display unit after the third detection.

3. The image pickup apparatus according to claim 2, further comprising:

notification unit configured to notify the user that a flicker has been detected in the case that a flicker is detected in the flicker detection operation; and operation unit configured to enable the user to perform an operation to instruct the detection unit to start the flicker detection operation, wherein, the detection unit is configured to perform the first detection in the case that the user performs an operation on the operation unit that instructs the detection unit to start the flicker detection operation, and wherein the notification unit notifies the user that a flicker has been detected in the case that a flicker is detected in the first detection.

4. The image pickup apparatus according to claim 3, wherein, the user is notified that a flicker has been detected by displaying a predetermined icon during live view display.

5. The image pickup apparatus according to claim 1, wherein the detection unit is configured to perform the flicker detection operation based on a plurality of images that are captured at intervals which are shorter than intervals at which images for live view display are captured.

6. The image pickup apparatus according to claim 1, wherein the predetermined timing is a timing at which a peak of the light amount change of the flicker detected by the detection unit is included.

7. The image pickup apparatus according to claim 1, further comprising:

mode setting unit configured to set a first mode for performing live view display reflecting user-set exposure conditions on the display unit, and a second mode for performing live view display without reflecting the user-set exposure conditions on the display unit, unlike the first mode; and photometry unit configured to perform a photometry on a subject based on an image captured by using the image sensor, wherein, in the case that the first mode is set by the setting unit, the detection unit is configured to acquire a plurality of images based on a result of the photometry by the photometry unit and is configured to perform the flicker detection operation based on the plurality of the images, regardless of the user-set exposure conditions.

8. The image pickup apparatus according to claim 7, wherein the second mode is a mode for performing live view display based on the result of the photometry by the photometry unit without reflecting the user-set exposure conditions.

9. The image pickup apparatus according to claim 8, wherein the photometry unit is further configured to perform the photometry based on any one of a plurality of prepared photometry modes, and wherein, regardless of the photometry mode, the detection unit is further configured to perform the flicker detection operation based on the result of the photometry by the photometry unit acquired through a predetermined method.

10. The image pickup apparatus according to claim 1, further comprising:

light amount control calculation unit configured to perform a light amount control calculation for calculating a light emission amount in light emission image capturing using at least one light emitting device, based on an information obtained by pre-light emission by the at least one light emitting device; and determination unit configured to determine an order of performing the flicker detection operation by the detection unit and the pre-light emission related to the light amount control calculation, wherein the determination unit is further configured to determine the order of the flicker detection operation and the pre-light emission based on predetermined conditions when performing a subject image pickup.

11. The image pickup apparatus according to claim 10, wherein the predetermined conditions are based on at least one of: information about the number of light emitting devices, information about whether a face region is included in an image pickup target subject, information about a shutter drive method, and information about an amount of movement of the image pickup target subject.

12. The image pickup apparatus according to claim 1, further comprising:

an aperture;

determination unit configured to determine whether the aperture can be driven to a target open area amount of the aperture without an aperture drive to a position where the open area amount of the aperture unit a maximum aperture; and aperture drive unit configured to control the drive of the aperture, wherein the aperture drive unit is configured to drive the aperture to achieve the open area amount of a predetermined value or larger in the case that the determination unit determines that the aperture can be driven to the target open area amount of the aperture without an aperture drive to the position where the open area amount of the aperture unit the maximum aperture and that a current open area amount of the aperture is smaller than the predetermined value.

13. The image pickup apparatus according to claim 12, wherein an interchangeable lens including the aperture can be detachably attached to the image pickup apparatus, wherein the determination unit is configured to determine whether the interchangeable lens attached to the image pickup apparatus is a first lens to detect whether the aperture can be driven to the target open area amount of the aperture without an aperture drive to the position where the open area amount of the aperture means the maximum aperture, and wherein, in the case that the determination unit determines that the interchangeable lens attached to the image pickup apparatus is not the first lens, the aperture drive unit drives the aperture in accordance with the flicker detection operation so that the open area amount of the aperture becomes the maximum aperture.

14. The image pickup apparatus according to claim 1, further comprising:

photometry unit configured to perform photometry on a subject based on an image captured by the image sensor; and correction unit configured to correct a result of the photometry by the photometry unit based on exposure conditions when performing a subject image pickup, wherein the correction unit is further configured to correct the result of the photometry by the photometry unit based on:

a first correction amount for a first image capturing in continuous image capturing in the case that continuous still image capturing is performed during live view display, and a second correction amount so as to reduce an influence of the first correction amount for the second image pickup in the case that the photometry unit performs a photometry based on an image captured by the first image capturing for second image capturing following the first image capturing in the continuous image capturing.

15. The image pickup apparatus according to claim 14, wherein the correction unit is configured to increase a correction amount with decreasing exposure time when performing a subject image pickup.

16. A method for controlling an image pickup apparatus including an image sensor and display unit configured to display a live view of images picked up by the image sensor, the control method comprising:

detecting a flicker by performing a flicker detection operation to detect flicker based on a plurality of images captured by the image sensor at predetermined intervals; and controlling the image sensor based on detected flicker information, wherein, in the detection, first detection of the flicker detection operation is performed at a time that is different from a time at which an image pickup preparation instruction is received and different from a time at which an image pickup instruction is received whilst live view images are displayed on the display unit, and second detection of the flicker detection operation according to the image pickup preparation instruction or the image pickup instruction by a user at a timing that is different from the time at which the first detection is performed, wherein the first and the second detections are performed in the case that a first setting for performing an image pickup in accordance with a predetermined timing of a light amount change of the flicker is preset to ON, and the first detection is performed without performing the second detection in the case that the first setting is preset to OFF, wherein, in the case that a flicker is detected in the first detection, exposure of the image sensor is controlled in a charge accumulation period to reduce an influence of the flicker for live view display on the display unit after the first detection, and wherein, in the case that a flicker is detected in the second detection, exposure of the image sensor is controlled for capturing a still image in accordance with a predetermined timing of a light amount change of the flicker.

17. A non-transitory computer-readable storage medium corresponding to instructions which, when executed by a processor, cause the processor to carry out the method of claim 16.

* * * * *